(12) United States Patent
Nomura et al.

(10) Patent No.: US 10,683,233 B2
(45) Date of Patent: Jun. 16, 2020

(54) LIGHT SELECTIVE TRANSMISSION TYPE GLASS AND LAMINATED SUBSTRATE

(71) Applicant: AGC Inc., Chiyoda-ku (JP)

(72) Inventors: Shuhei Nomura, Tokyo (JP); Kazutaka Ono, Tokyo (JP); Yoshiharu Ooi, Tokyo (JP); Hiroki Hotaka, Tokyo (JP)

(73) Assignee: AGC Inc., Chiyoda-ku (JP)

(*) Notice: Subject to any disclaimer, the term of this patent is extended or adjusted under 35 U.S.C. 154(b) by 197 days.

(21) Appl. No.: 15/667,191

(22) Filed: Aug. 2, 2017

(65) Prior Publication Data

US 2017/0355637 A1 Dec. 14, 2017

Related U.S. Application Data

(63) Continuation of application No. PCT/JP2016/053055, filed on Feb. 2, 2016.

(30) Foreign Application Priority Data

Feb. 6, 2015 (JP) ................................ 2015-022719
Dec. 10, 2015 (JP) ................................ 2015-241303

(51) Int. Cl.
*B32B 15/04* (2006.01)
*B32B 17/06* (2006.01)
(Continued)

(52) U.S. Cl.
CPC ............ *C03C 4/085* (2013.01); *B32B 7/12* (2013.01); *B32B 9/041* (2013.01); *B32B 17/064* (2013.01);
(Continued)

(58) Field of Classification Search
USPC ........................................ 428/426, 428, 432
See application file for complete search history.

(56) References Cited

U.S. PATENT DOCUMENTS

2006/0003884 A1\* 1/2006 Nishizawa ............ C03C 3/091
501/72
2009/0270242 A1\* 10/2009 Yanase .................. C03C 3/091
501/67
(Continued)

FOREIGN PATENT DOCUMENTS

JP 3153710 B2 1/2001
JP 2004-315354 11/2004
(Continued)

OTHER PUBLICATIONS

International Search Report dated Mar. 29, 2016 in PCT/JP2016/053047 (with English translation), 5 pages.
(Continued)

*Primary Examiner* — Lauren R Colgan
(74) *Attorney, Agent, or Firm* — Oblon, McClelland, Maier & Neustadt, L.L.P.

(57) ABSTRACT

A light selective transmission type glass 10 according to the present invention includes: a glass substrate 12; and a light selective transmission layer 11 provided on at least one main surface of the glass substrate 12. The glass substrate 12 has an average thermal expansion coefficient $\alpha_{50/100}$ at 50° C. to 100° C. of 2.70 ppm/° C. to 3.20 ppm/° C., an average thermal expansion coefficient $\alpha_{200/300}$ at 200° C. to 300° C. of 3.45 ppm/° C. to 3.95 ppm/° C., a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30, and a content of an alkali metal oxide being 0% to 0.1%.

15 Claims, 4 Drawing Sheets

(51) Int. Cl.
*C03C 4/08* (2006.01)
*C03C 3/085* (2006.01)
*C03C 3/087* (2006.01)
*C03B 25/02* (2006.01)
*C03C 27/00* (2006.01)
*B32B 9/04* (2006.01)
*B32B 7/12* (2006.01)
*C03C 3/091* (2006.01)
*C03B 17/06* (2006.01)
*C03C 3/093* (2006.01)
*C03C 17/25* (2006.01)
*G02B 5/20* (2006.01)
*G02B 5/22* (2006.01)

(52) U.S. Cl.
CPC ............ *C03B 17/067* (2013.01); *C03B 25/02* (2013.01); *C03C 3/085* (2013.01); *C03C 3/087* (2013.01); *C03C 3/091* (2013.01); *C03C 3/093* (2013.01); *C03C 4/082* (2013.01); *C03C 17/25* (2013.01); *C03C 27/00* (2013.01); *G02B 5/208* (2013.01); *G02B 5/223* (2013.01); *G02B 5/226* (2013.01); *B32B 2307/306* (2013.01); *B32B 2383/00* (2013.01)

(56) References Cited

U.S. PATENT DOCUMENTS

| | | |
|---|---|---|
| 2009/0294773 A1 | 12/2009 | Ellison |
| 2011/0318561 A1 | 12/2011 | Murata et al. |
| 2012/0302063 A1 | 11/2012 | Markham et al. |
| 2013/0267402 A1* | 10/2013 | Nishizawa .............. C03C 3/085 501/66 |
| 2014/0091419 A1* | 4/2014 | Hasegawa ............ G02B 13/004 257/432 |
| 2015/0093561 A1 | 4/2015 | Tokunaga et al. |
| 2015/0160386 A1 | 6/2015 | Takemura |

FOREIGN PATENT DOCUMENTS

| | | |
|---|---|---|
| JP | 2009-286689 | 12/2009 |
| JP | 2011-20864 | 2/2011 |
| JP | 2013-257532 | 12/2013 |
| WO | WO 2010/107111 A1 | 9/2010 |
| WO | WO 2013/099970 A1 | 7/2013 |
| WO | WO 2013/183681 A1 | 12/2013 |
| WO | WO 2014/034386 A1 | 3/2014 |

OTHER PUBLICATIONS

Written Opinion of the International Searching Authority dated Mar. 29, 2016 in PCT/JP2016/053047 (with English translation), 9 pages.
U.S. Appl. No. 15/666,862, filed Aug. 2, 2017, US 2017-0327408 A1, Nomura, S., et al.
International Search Report dated Mar. 29, 2016 in PCT/JP2016/053055, filed on Feb. 2, 2016 (with English translation).
Written Opinion dated Mar. 29, 2016 in PCT/JP2016/053055, filed on Feb. 2, 2016.

* cited by examiner

LIGHT SELECTIVE TRANSMISSION TYPE GLASS AND LAMINATED SUBSTRATE

CROSS-REFERENCE TO RELATED APPLICATIONS

This application is a Continuation of PCT/JP2016/053055, which was filed on Feb. 2, 2016. This application is based upon and claims the benefit of priority to Japanese Application No. 2015-241303, which was filed on Dec. 10, 2015, and to Japanese Application No. 2015-022719, which was filed on Feb. 6, 2015.

TECHNICAL FIELD

The present invention relates to a light selective transmission type glass and a laminated substrate.

BACKGROUND ART

For an imaging unit using a solid-state imaging element (representatively a camera module), an optical filter that transmits or shuts off a wavelength of a specified range (for example, a light selective transmission type glass) is used. Examples thereof include optical filters for imaging unit, such as a color filter for color image production, an optical filter for sensitivity correction that transmits a visible light and shuts off a near infrared light, etc.

As the optical filter for sensitivity correction, for example, optical filters that selectively shut off near infrared rays, in which CuO, etc. is added to a fluorophosphate-based glass, a phosphate-based glass, or the like, are known (see Patent Document 1).

BACKGROUND ART DOCUMENT

Patent Document

Patent Document 1: WO 2014/034386

SUMMARY OF THE INVENTION

Problems that the Invention is to Solve

Following requirements of miniaturization and profile reduction of imaging unit, thinning of optical parts or reduction of the number of parts in the imaging unit is required. As a means for miniaturizing the imaging unit, it is investigated to integrate a solid-state imaging element with an optical filter.

The solid-state imaging element has a photodetector array having a CMOS or CCD structure in which several hundred thousand to several million pixels having a size of 1 to 4 µm square are two-dimensionally arranged. Furthermore, the solid-state imaging element is provided with an RGB mosaic color filter in every pixel on the incident side of the photodetector for the purpose of forming a color image and further provided thereon with a resin microlens that condenses the incident light on the light-receiving plane of the photodetector in every pixel.

For example, in the case of integrating a solid-state imaging element with a light selective transmission type glass, when passing through a step of individually integrating small pieces of the light selective transmission type glass, the productivity is low. On the other hand, in connection with a substrate process of forming an RGB mosaic color filter and a resin microlens in every solid-state imaging element in a state of silicon substrate, when integrated with the light selective transmission type glass in a substrate (wafer) state, the productivity can be improved.

In the case of sticking a glass substrate constituting the light selective transmission type glass to a silicon substrate, a thermoplastic resin is frequently used for an adhesive layer. In this case, though the silicon substrate and the glass substrate are bonded to each other at a high temperature, on the occasion of cooling the glass substrate and the silicon substrate adhered to each other at a high temperature, if a difference in thermal expansion coefficient is present between the glass substrate and the silicon substrate, a stress is generated in each of the glass substrate and the silicon substrate. As a result, there is a concern that a mechanical strain is generated in the silicon substrate and the light selective transmission type glass, and the resulting laminated substrate is warped, whereby a failure is generated in the laminated substrate production process, or an optical strain is generated in the light selective transmission type glass.

In addition, in the case of forming an RGB mosaic color filter in a cover glass, there is a concern that a pattern deviation between the color filter and the photodetector array is caused. In particular, in recent years, for the purpose of improving the productivity, the size of the silicon substrate has exceeded 200 mm in diameter. Thus, there was a concern that the mechanical strain to be caused due to a mismatch in the thermal expansion coefficient, or the optical strain caused thereby becomes larger.

An object of the present invention is to provide a light selective transmission type glass capable of suppressing deformation or an optical strain of a laminated substrate which is obtained through lamination with a silicon substrate. In addition, an object of the present invention is to provide a laminated substrate in which deformation or generation of a strain is suppressed.

Means for Solving the Problems

The present invention relates to a light selective transmission type glass including:

a glass substrate; and a light selective transmission layer that is provided on at least one main surface of the glass substrate and selectively transmits at least one selected from the group consisting of near infrared rays, visible light rays, visible light rays of a blue wavelength region, visible light rays of a red wavelength region, and visible light rays of a green wavelength region, among near infrared rays and visible light rays, in which the glass substrate has:

an average thermal expansion coefficient $\alpha_{50/100}$ at 50° C. to 100° C. of 2.70 ppm/° C. to 3.20 ppm/° C.;

an average thermal expansion coefficient $\alpha_{200/300}$ at 200° C. to 300° C. of 3.45 ppm/° C. to 3.95 ppm/° C.;

a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30; and a content of an alkali metal oxide being 0% to 0.1% as expressed in terms of a molar percentage based on oxides.

Additionally, the present invention provides a laminated substrate including: a solid-state imaging element provided on a silicon substrate; and the above-described light selective transmission type glass.

In the present specification, the terms "A to B" expressing the numerical value range are used in order to mean that the numerical values described before and after that are included as a lower limit value and an upper limit value, and in the following present specification, the terms "A to B" are used as the same meanings unless otherwise indicated.

In addition, in the present specification, the % expression used for describing the content of each of the components in the glass substrate and in the method for producing the same is expressed in terms of a molar percentage (mol %) based on oxides unless otherwise indicated.

Advantage of the Invention

The present invention is able to provide a light selective transmission type glass which can suppress deformation or generation of a strain when forming into a laminated substrate through lamination with a silicon substrate. In addition, the present invention is able to provide a laminated substrate in which deformation or generation of a strain is suppressed.

MODE FOR CARRYING OUT THE INVENTION

The light selective transmission type glass as an embodiment of the present invention is described by reference to FIGS. 1A to 1C. Although an application of the light selective transmission type glass as an embodiment of the present invention is not particularly restricted, examples thereof include a near infrared ray cut filter that shuts off near infrared rays and selectively transmits visible light rays; a near infrared ray transmission filter that shuts off visible light rays and transmits near infrared rays; and a color filter that selectively transmits at least one selected from the group consisting of visible light rays of a blue wavelength region, visible light rays of a red wavelength region, and visible light rays of a green wavelength region.

Figure 1A:
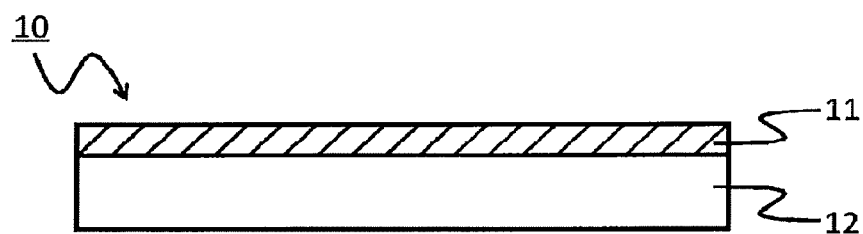
FIG. 1A is a cross-section view diagrammatically showing an example of a light selective transmission type glass.

FIG. 1A shows a light selective transmission type glass 10 having a light selective transmission layer 11 on one surface of a glass substrate 12 having a parallel plane shape.

(Glass Substrate)

The glass substrate 12 includes a glass material that is transparent at least against a visible light having a wavelength of 380 nm to 780 nm. Furthermore, the surface of the glass substrate 12 has only to have surface flatness such that generation of a scattered light deteriorating a resolution of a solid-state imaging element, or transmission wavefront aberration can be suppressed, and not only one surface but also both surfaces may be subjected to mirror processing.

In the glass substrate 12, an average thermal expansion coefficient $\alpha_{50/100}$ at 50° C. to 100° C. is 2.70 ppm/° C. to 3.20 ppm/° C. $\alpha_{50/100}$ is preferably 2.80 ppm/° C. or more, more preferably 2.90 ppm/° C. or more, still more preferably 2.91 ppm/° C. or more, and especially preferably 2.92 ppm/° C. or more. In addition, $\alpha_{50/100}$ is preferably 3.10 ppm/° C. or less, more preferably 3.00 ppm/° C. or less, still more preferably 2.96 ppm/° C. or less, and especially preferably 2.94 ppm/° C. or less.

When $\alpha_{50/100}$ falls within the above-described range, since the difference in thermal expansion coefficient between the glass substrate and the silicon substrate is small, in the heat treatment step of sticking the silicon substrate and the glass substrate to each other, the residual strain generated in the silicon substrate and the glass substrate can be made small while securing a process margin.

The "average thermal expansion coefficient $\alpha_{50/100}$ at 50° C. to 100° C." as referred to herein is an average thermal expansion coefficient as measured by the method prescribed in JIS R3102 (1995), in which a temperature range of measuring the thermal expansion coefficient is 50° C. to 100° C.

In addition, in the glass substrate 12, an average thermal expansion coefficient $\alpha_{200/300}$ at 200° C. to 300° C. is 3.45 ppm/° C. to 3.95 ppm/° C. $\alpha_{200/300}$ is preferably 3.55 ppm/° C. or more, more preferably 3.65 ppm/° C. or more, especially preferably 3.66 ppm/° C. or more, and most preferably 3.68 ppm/° C. or more. In addition, $\alpha_{200/300}$ is preferably 3.85 ppm/° C. or less, more preferably 3.75 ppm/° C. or less, especially preferably 3.73 ppm/° C. or less, and most preferably 3.71 ppm/° C. or less.

When $\alpha_{200/300}$ falls within the above-described range, failures, such as generation of a residual strain to be caused due to the difference in thermal expansion coefficient from the silicon substrate, etc., can be meaningfully suppressed while securing a process margin on the occasion of sticking the glass substrate to the silicon substrate. In addition, when $\alpha_{200/300}$ is 3.55 ppm/° C. to 3.85 ppm/° C., since the difference in thermal expansion coefficient from the silicon substrate is sufficiently small, the failures to be caused due to the difference in thermal expansion coefficient can be more suppressed.

The "average thermal expansion coefficient $\alpha_{200/300}$ at 200° C. to 300° C." as referred to herein is an average thermal expansion coefficient as measured by the method prescribed in JIS R3102 (1995), in which a temperature range of measuring the thermal expansion coefficient is 200° C. to 300° C.

In the glass substrate 12, a value $\alpha_{200/300}/\alpha_{50/100}$ that is a value obtained by dividing the average thermal expansion coefficient $\alpha_{200/300}$ at 200° C. to 300° C. by the average thermal expansion coefficient $\alpha_{50/100}$ at 50° C. to 100° C. is 1.20 to 1.30. When $\alpha_{200/300}/\alpha_{50/100}$ falls within the above-described range, since the difference in thermal expansion coefficient from the silicon substrate is small, in the heat treatment step of sticking the silicon substrate and the glass substrate to each other, the residual strain generated in the silicon substrate and the glass substrate is small. $\alpha_{200/300}/\alpha_{50/100}$ is preferably 1.24 to 1.27.

In the glass substrate 12, the content of an alkali metal oxide is 0% to 0.1%. Here, the alkali metal oxide refers to $Li_2O$, $Na_2O$, $K_2O$, and the like. When the content of the alkali metal oxide is 0.1% or less, in the heat treatment step of sticking the silicon substrate and the glass substrate to each other, the alkali ion is hardly diffused into the silicon substrate. The content of the alkali metal oxide is more preferably 0.05% or less, and still more preferably 0.02% or less, and it is especially preferred that the alkali metal oxide is not substantially contained. Here, it is meant by the terms "the alkali metal oxide is not substantially contained" that the alkali metal oxide is not contained at all, or the alkali metal oxide may be contained as an impurity which is unavoidably included on the production.

It is preferred that the glass substrate 12 has a composition including:
$SiO_2$: 50% to 75%;
$Al_2O_3$: 6% to 16%;
$B_2O_3$: 0% to 15%,
MgO: 0% to 15%;
CaO: 0% to 13%;
SrO: 0% to 11%; and
BaO: 0% to 9.5%.

$SiO_2$ is a component of forming a structure of glass. When the content of $SiO_2$ is 50% or more, heat resistance, chemical durability, and weather resistance become satisfactory. When the content of $SiO_2$ is 75% or less, meltability becomes satisfactory while viscosity at the time of glass melting does not become excessively high. The content of $SiO_2$ is preferably 60% or more, and more preferably 64% or more. In addition, the content of $SiO_2$ is preferably 70% or less, and more preferably 68% or less.

When the content of $Al_2O_3$ is 6% or more, weather resistance, heat resistance, and chemical durability become satisfactory, and a Young's modulus becomes high. When the content of $Al_2O_3$ is 16% or less, meltability becomes satisfactory while viscosity at the time of glass melting does not become excessively high, and devitrification hardly takes place. The content of $Al_2O_3$ is preferably 8% or more, and more preferably 11% or more. In addition, the content of $Al_2O_3$ is preferably 14% or less.

Although $B_2O_3$ is not an essential component, when $B_2O_3$ is contained, meltability becomes satisfactory while viscosity at the time of glass melting does not become excessively high, and devitrification hardly takes place. When the content of $B_2O_3$ is 15% or less, a glass transition temperature can be made high, and a Young's modulus becomes high. The content of $B_2O_3$ is more preferably 3% or more. In addition, the content of $B_2O_3$ is preferably 12% or less, and more preferably 6% or less.

Although MgO is not an essential component, when MgO is contained, meltability becomes satisfactory while viscosity at the time of glass melting does not become excessively high, weather resistance is improved, and a Young's modulus becomes high. When the content of MgO is 15% or less, devitrification hardly takes place. The content of MgO is preferably 4% or more, and more preferably 6% or more. In addition, the content of MgO is preferably 10% or less, more preferably 9.5% or less, and still more preferably 9% or less.

Although CaO is not an essential component, when CaO is contained, meltability becomes satisfactory while viscosity at the time of glass melting does not become excessively high, and weather resistance is improved. When the content of CaO is 13% or less, devitrification hardly takes place. The content of CaO is preferably 4% or more. In addition, the content of CaO is preferably 10% or less, and more preferably 8% or less.

Although SrO is not an essential component, when SrO is contained, meltability becomes satisfactory while viscosity at the time of glass melting does not become excessively high, and weather resistance is improved. When the content of SrO is 11% or less, devitrification hardly takes place. The content of SrO is preferably 0.5% or more. In addition, the content of SrO is preferably 8% or less, and more preferably 3% or less.

Although BaO is not an essential component, when BaO is contained, meltability becomes satisfactory while viscosity at the time of glass melting does not become excessively high, and weather resistance is improved. When the content of BaO is 9.5% or less, devitrification hardly takes place. The content of BaO is preferably 3% or less, and more preferably 2% or less.

In the glass substrate 12, a total content of CaO, SrO, and BaO is preferably 7% or more. When the total content of CaO, SrO, and BaO is 7% or more, devitrification hardly takes place. The total content of CaO, SrO, and BaO is more preferably 7.5% or more, and still more preferably 8.0% or more.

In the glass substrate 12, it is preferable to satisfy a relation of {(content of $Al_2O_3$)≥(content of MgO)}. When the relation of {(content of $Al_2O_3$)≥(content of MgO)} is satisfied, it is easy to make the average thermal expansion coefficient of the glass substrate to conform to the average thermal expansion coefficient of the silicon substrate, and in the heat treatment step of sticking the silicon substrate and the glass substrate to each other, the residual strain generated in the silicon substrate and the glass substrate is small.

In the glass substrate 12, a devitrification viscosity ($\eta_{TL}$) is preferably $10^{3.8}$ dPa·sec or more. When the devitrification viscosity is $10^{3.8}$ dPa·sec or more, forming can be stably performed. The devitrification viscosity is more preferably $10^{4.0}$ dPa·sec or more, and still more preferably $10^{4.2}$ dPa·sec or more.

In the glass substrate 12, when used as a substrate of an optical filter of CMOS sensor, in order to more enhance the color reproducibility of an image to be photographed, it is suitable that the transmittance is high. Therefore, the content of $Fe_2O_3$ is preferably 200 ppm or less as expressed in terms of parts per million mass based on oxides. The content of $Fe_2O_3$ is more preferably 150 ppm or less, still more preferably 100 ppm or less, and especially preferably 50 ppm or less.

In the glass substrate 12, in order to make a thermal conductivity high and to make the meltability satisfactory, it is preferred to contain $Fe_2O_3$ in an amount of more than 200 ppm and 1,000 ppm or less as expressed in terms of parts per million mass based on oxides. When the content of $Fe_2O_3$ is more than 200 ppm, it is possible to make the thermal conductivity of the glass substrate high and to make the meltability satisfactory. When the content of $Fe_2O_3$ is 1,000 ppm or less, absorption of a visible light does not become excessively strong.

The content of $Fe_2O_3$ is more preferably 300 ppm or more, still more preferably 400 ppm or more, and especially preferably 500 ppm or more. The content of $Fe_2O_3$ is more preferably 800 ppm or less, still more preferably 700 ppm or less, and especially preferably 600 ppm or less.

In the glass substrate 12, for example, $SnO_2$, $SO_3$, Cl, F, or the like may be contained as a refining agent.

In the glass substrate 12, in order to improve weather resistance, solubility, devitrification properties, ultraviolet shielding, infrared shielding, ultraviolet transmission, infrared transmission, and so on, for example, ZnO, $Li_2O$, $WO_3$, $Nb_2O_5$, $V_2O_5$, $Bi_2O_3$, $MoO_3$, $P_2O_5$, $Ga_2O_3$, $In_2O_5$, $In_2O_5$, $Ge_2O_5$, and the like may be contained.

In the glass substrate 12, in order to improve the chemical durability of glass, $ZrO_2$, $Y_2O_3$, $La_2O_3$, $TiO_2$, and $SnO_2$ may be contained in an amount of 2% or less, preferably 1% or less, and more preferably 0.5% or less in total in the glass. Among those, $Y_2O_3$, $La_2O_3$, and $TiO_2$ also contribute to an improvement of the Young's modulus of glass.

In the glass substrate 12, taking into consideration an environmental load, it is preferred that $As_2O_3$ and $Sb_2O_3$ are not substantially contained. In addition, taking into consideration stable float forming, it is preferred that ZnO is not substantially contained.

In the glass substrate 12, an average thermal expansion coefficient $\alpha_{100/200}$ at 100° C. to 200° C. is preferably 3.13 ppm/° C. to 3.63 ppm/° C., and more preferably 3.23 ppm/° C. to 3.53 ppm/° C. When $\alpha_{100/200}$ falls within the above-described range, since the difference in thermal expansion coefficient from the silicon substrate is small, in the heat treatment step of sticking the silicon substrate and the glass substrate to each other, the residual stress generated in the silicon substrate and the glass substrate can be made small while securing a process margin.

$\alpha_{100/200}$ is still more preferably 3.33 ppm/° C. or more, especially preferably 3.34 ppm/° C. or more, and most preferably 3.35 ppm/° C. or more. In addition, $\alpha_{100/200}$ is still more preferably 3.43 ppm/° C. or less, especially preferably 3.41 ppm/° C. or less, and most preferably 3.38 ppm/° C. or less.

The "average thermal expansion coefficient $\alpha_{100/200}$ at 100° C. to 200° C." as referred to herein is an average thermal expansion coefficient as measured by the method prescribed in JIS R3102 (1995), in which a temperature range of measuring the thermal expansion coefficient is 100° C. to 200° C.

In the glass substrate 12, a Young's modulus is preferably 80 GPa or more. When the Young's modulus is 80 GPa or more, a warpage or cracks of the glass substrate generated in a cooling step on the occasion of producing a glass substrate can be suppressed. In addition, breakage to be caused due to contact with the silicon substrate or peripheral members or the like can be suppressed. The Young's modulus is more preferably 81 GPa or more, still more preferably 82 GPa or more, and especially preferably 84 GPa or more.

In addition, the Young's modulus is preferably 100 GPa or less. When the Young's modulus is 100 GPa or less, the glass becomes less-brittle, whereby fracture or chipping at the cutting or dicing process of the glass substrate can be suppressed. The Young's modulus is more preferably 90 GPa or less, and still more preferably 87 GPa or less.

In the glass substrate 12, a thickness thereof is preferably 1.0 mm or less. When the thickness is 1.0 mm or less, the image sensor can be miniaturized. The thickness is more preferably 0.8 mm or less, still more preferably 0.7 mm or less, and especially preferably 0.5 mm or less.

In the addition, the thickness is preferably 0.1 mm or more. When the thickness is 0.1 mm or more, breakage to be caused due to contact with the silicon substrate or peripheral members or the like can be suppressed. In addition, gravitational sag of the light selective transmission type glass can be suppressed. The thickness is more preferably 0.2 mm or more, and still more preferably 0.3 mm or more.

In the glass substrate 12, an area thereof is preferably 0.01 $m^2$ or more. When the area is 0.01 $m^2$ or more, a silicon substrate having a large area can be used, and a large number of image sensors can be produced. The area may be 0.02 $m^2$ or more, may be 0.03 $m^2$ or more, may be 0.04 $m^2$ or more, and may be 0.05 $m^2$ or more.

In addition, in the glass substrate 12 as an embodiment of the present invention, since $\alpha_{200/300}$ is 3.45 ppm/° C. to 3.95 ppm/° C., and $\alpha_{200/300}/\alpha_{50/100}$ is 1.20 to 1.30, even when the area is 0.01 $m^2$ or more, the residual stress generated in the silicon substrate and the glass substrate in the heat treatment step of sticking the silicon substrate and the glass substrate to each other is small. The area is preferably 0.1 $m^2$ or less. When the area is 0.1 $m^2$ or less, handling of the light selective transmission type glass becomes easy, and breakage to be caused due to contact with the silicon substrate or peripheral members or the like can be suppressed. The area is more preferably 0.08 $m^2$ or less, and still more preferably 0.06 $m^2$ or less.

In the glass substrate 12 as an embodiment of the present invention, a density thereof is preferably 2.60 $g/cm^3$ or less. When the density is 2.60 $g/cm^3$ or less, the light selective transmission type glass is lightweight. In addition, gravitational sag of the light selective transmission type glass can be reduced. The density is more preferably 2.55 $g/cm^3$ or less, and still more preferably 2.50 $g/cm^3$ or less.

The density is preferably 2.20 $g/cm^3$ or more. When the density is 2.20 $g/cm^3$ or more, a Vickers hardness of the glass becomes high, so that the glass surface can be made to be hardly scratched. The density is more preferably 2.30 $g/cm^3$ or more, still more preferably 2.40 $g/cm^3$ or more, and especially preferably 2.45 $g/cm^3$ or more.

In the glass substrate 12 as an embodiment of the present invention, a density of defect contained in the glass substrate is preferably one or less per $cm^2$. The defect contained in the glass substrate refers to a bubble, a scratch, a metal impurity such as platinum, etc., a residual raw material, and the like existing on the surface or inside of the glass substrate, a size of which is 0.5 μm or more and 1 mm or less. When the defect is larger than 1 mm, it can be easily discriminated through visual inspection, and it is easy to exclude a substrate having a defect. When the defect is smaller than 0.5 μm, since the defects are thoroughly small, even when applied as the cover glass of CMOS sensor or LCOS, there is no concern that such a defect affects characteristics of element.

In the conventional semiconductor assembly process, the assembly process was performed after cutting a light selective transmission type glass, and therefore, in the case where the glass substrate involves a defect, the substrate involving such a defect could be excluded at the initial stage. On the other hand, in the wafer-level package, since singulation of the laminated substrate is performed at the very end of the assembly process, in the case where the glass substrate involves a defect, what the glass substrate involving such a defect can be excluded is made at the very end of the assembly process. Thus, in the wafer-level package, in the case where the density of defect of the glass substrate increases, an increase of costs becomes large, and therefore, high-quality control of defect is required. The density of defect is more preferably 0.1 or less per $cm^2$, and still more preferably 0.01 or less per $cm^2$.

If heterogeneity of refractive index represented by a stria is present in the glass substrate, a photographed image or a projected image is distorted, and the quality of a photograph or image is deteriorated. For that reason, it is preferred that the glass substrate is free from heterogeneity of refractive index. In addition, in the case where a stria is present in the glass substrate, a difference of the refractive index is preferably within $10^{-4}$, and more preferably within $10^{-5}$.

A shape of the glass substrate may be any of a circle, an ellipse, or a rectangle. In order to make the shape of the glass substrate conform to a shape of the silicon substrate, a notch may be provided in an end of the glass substrate, and in the case where the glass substrate is circular, a part of the outer periphery of the glass substrate may be a straight line.

In the glass substrate 12 as an embodiment of the present invention, a glass transition point (Tg) is preferably 700° C. or higher. When the glass transition point (Tg) is 700° C. or higher, a dimensional change of the glass substrate in the heat treatment step can be suppressed to be small. The glass transition point (Tg) is more preferably 720° C. or higher, and still more preferably 740° C. or higher.

In the glass substrate, a fictive viscosity thereof is preferably $10^{11.0}$ dPa·sec to $10^{14.1}$ dPa·sec. In order to regulate the fictive viscosity to $10^{11.0}$ dPa·sec to $10^{14.1}$ dPa·sec, it is necessary to make a cooling rate after forming of the glass substrate corresponding to 1° C./min to 1,200° C./min. When the fictive viscosity is $10^{11.0}$ dPa·sec to $10^{14.1}$ dPa·sec, the average thermal expansion coefficient of the glass substrate becomes close to the average thermal expansion coefficient of the silicone substrate, and the residual stress generated in the silicon substrate and the glass substrate in the heat treatment step of sticking the silicon substrate and the glass substrate to each other is small. The fictive viscosity of the glass substrate is more preferably $10^{12.1}$ dPa·sec to $10^{13.1}$ dPa·sec (corresponding to a cooling rate of 10° C./min to 100° C./min).

The fictive viscosity (η) of the glass can be calculated according to the following equation (4) (G. W. Scherer, "Relaxation in Glass and Composites", Wiley, New York (1986), p. 159).

$$\log_{10} \eta = 12.3 - \log_{10}|q| \quad (4)$$

Here, the unit of η is dPa·sec, and q is an assumed cooling rate, a unit of which is ° C./s.

The assumed cooling rate q is determined from the glass substrate by the following method. Plural small glass pieces are cut out from one sheet of glass substrate having a thickness of 1 mm or less. For example, a small piece of 1 cm square is cut out as the small glass piece. The cut-out plural small glass pieces are respectively heat treated and cooled at various cooling rates V, and physical property values of the respective small glass pieces are measured. A cooling start temperature is preferably a sufficiently high temperature at which any influence is not given by the cooling rate. Typically, the cooling start temperature is preferably approximately (Tg+50° C.) to (Tg+150° C.).

Although the physical property values for carrying out the measurement are not particularly restricted, a density, physical property values in a close relation with the density (for example, a refractive index), and so on are preferred. A calibration curve A is prepared by plotting the cooling rate ($\log_{10}$V) on the x-axis and plotting the physical property values of the respective heat-treated small glass pieces on the y-axis. From the physical property values of a small glass piece not having been subjected to a heat treatment, the assumed cooling rate q of the glass substrate is determined according to the prepared calibration curve A.

In the glass substrate 12 as an embodiment of the present invention, a temperature at which the viscosity becomes $10^2$ dPa·sec ($T_2$) is preferably 1,800° C. or lower. $T_2$ is more preferably 1,750° C. or lower, still more preferably 1,700° C. or lower, and especially preferably 1,650° C. or lower.

In the glass substrate 12 as an embodiment of the present invention, a temperature ($T_4$) at which the viscosity becomes $10^4$ dPa·sec is preferably 1,350° C. or lower. $T_4$ is more preferably 1,300° C. or lower, still more preferably 1,275° C. or lower, and especially preferably 1,250° C. or lower. Taking into consideration easiness for securing other physical properties, the temperature ($T_4$) at which the viscosity becomes $10^4$ dPa·sec is 1,100° C. or higher.

In the glass substrate 12 as an embodiment of the present invention, a devitrification temperature thereof is preferably 1,325° C. or lower. The devitrification temperature is more preferably 1,300° C. or lower, still more preferably 1,275° C. or lower, and especially preferably 1,250° C. or lower. The glass devitrification temperature is one obtained in the following manner. That is, pulverized glass particles are put into a platinum-made dish and heat treated for 17 hours in an electric furnace controlled at a fixed temperature; after the heat treatment, the observation with an optical microscope is performed; and an average value between a maximum temperature at which a crystal is precipitated in the inside of the glass and a minimum temperature at which a crystal is not precipitated is defined as the devitrification temperature.

It is preferred that the glass substrate 12 as an embodiment of the present invention satisfies the followings:

{0.0177×(content of $SiO_2$)−0.0173×(content of $Al_2O_3$)+0.0377×(content of $B_2O_3$)+0.0771× (content of MgO)+0.1543×(content of CaO)+ 0.1808×(content of SrO)+0.2082×(content of BaO)+0.0344×(12.3+$\log_{10}$ 60−$\log_{10}$ η)} is 2.70 to 3.20;

{0.0181×(content of $SiO_2$)+0.0004×(content of $Al_2O_3$)+0.0387×(content of $B_2O_3$)+0.0913× (content of MgO)+0.1621×(content of CaO)+ 0.1900×(content of SrO)+0.2180×(content of BaO)+0.0391×(12.3+$\log_{10}$ 60−$\log_{10}$ η)} is 3.13 to 3.63;

{0.0177×(content of $SiO_2$)+0.0195×(content of $Al_2O_3$)+0.0323×(content of $B_2O_3$)+0.1015× (content of MgO)+0.1686×(content of CaO)+ 0.1990×(content of SrO)+0.2179×(content of BaO)+0.0312×(12.3+$\log_{10}$ 60−$\log_{10}$ η)} is 3.45 to 3.95; and {0.0111×(content of $SiO_2$)+0.0250×(content of $Al_2O_3$)+0.0078×(content of $B_2O_3$)+0.0144× (content of MgO)+0.0053×(content of CaO)+ 0.0052×(content of SrO)+0.0013×(content of BaO)−0.0041×(12.3+$\log_{10}$ 60−$\log_{10}$η)} is 1.20 to 1.30.

Here, the content of $SiO_2$, the content of $Al_2O_3$, the content of $B_2O_3$, the content of MgO, the content of CaO, the content of SrO, and the content of BaO are respectively a content of each of the components contained in the resulting glass; and η is a fictive viscosity (unit: dPa·sec).

When these are satisfied, in the heat treatment step of sticking the silicon substrate and the glass substrate to each other, the residual strain generated in the silicon substrate and the glass substrate can be made small while securing a process margin.

{0.0177×(content of $SiO_2$)−0.0173×(content of $Al_2O_3$)+ 0.0377×(content of $B_2O_3$)+0.0771×(content of MgO)+ 0.1543×(content of CaO)+0.1808×(content of SrO)+ 0.2082×(content of BaO)+0.0344×(12.3+$\log_{10}$ 60−$\log_{10}$η)} is more preferably 2.80 or more, still more preferably 2.90 or more, especially preferably 2.91 or more, and most preferably 2.92 or more.

In addition, {0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+ 0.2082×(content of BaO)+0.0344×(12.3+$\log_{10}$ 60−$\log_{10}$ η)} is more preferably 3.10 or less, still more preferably 3.00 or less, especially preferably 2.96 or less, and most preferably 2.94 or less.

{0.0181×(content of $SiO_2$)+0.0004×(content of $Al_2O_3$)+ 0.0387×(content of $B_2O_3$)+0.0913×(content of MgO)+

0.1621×(content of CaO)+0.1900×(content of SrO)+ 0.2180×(content of BaO)+0.0391×(12.3+$\log_{10}$ 60–$\log_{10}$ η)} is more preferably 3.23 or more, still more preferably 3.33 or more, especially preferably 3.34 or more, and most preferably 3.35 or more.

In addition, {0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+ 0.2180×(content of BaO)+0.0391×(12.3+$\log_{10}$ 60–$\log_{10}$ η)} is more preferably 3.53 or less, still more preferably 3.43 or less, especially preferably 3.41 or less, and most preferably 3.38 or less.

{0.0177×(content of $SiO_2$)+0.0195×(content of $Al_2O_3$)+ 0.0323×(content of $B_2O_3$)+0.1015×(content of MgO)+ 0.1686×(content of CaO)+0.1990×(content of SrO)+ 0.2179×(content of BaO)+0.0312×(12.3+$\log_{10}$ 60–$\log_{10}$ η)} is more preferably 3.55 or more, still more preferably 3.65 or more, especially preferably 3.66 or more, and most preferably 3.68 or more.

In addition, {0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+ 0.2179×(content of BaO)+0.0312×(12.3+$\log_{10}$ 60–$\log_{10}$ η)} is more preferably 3.85 or less, still more preferably 3.73 or less, especially preferably 3.71 or less, and most preferably 3.65 or less.

Furthermore, 0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+ 0.0013×(content of BaO)–0.0041×(12.3+$\log_{10}$ 60–$\log_{10}$ η)} is more preferably 1.24 or more.

In addition, 0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+ 0.0013×(content of BaO)–0.0041×(12.3+$\log_{10}$ 60–$\log_{10}$ η)} is more preferably 1.27 or less.

In the glass substrate 12 as an embodiment of the present invention, a weight loss value relative to a hydrofluoric aqueous solution (HF) (hereinafter also expressed as "HF weight loss value") is preferably 0.05 (mg/$cm^2$)/min or more and 0.20 (mg/$cm^2$)/min or less. Here, the HF weight loss value means a loss value per unit area and unit time ((mg/$cm^2$)/min) on the occasion of dipping the glass substrate at 25° C. in a 5 mass % hydrofluoric acid aqueous solution.

The glass substrate 12 as an embodiment of the present invention is, after being stuck to the silicon substrate, installed as an optical filter into a device. In such a case, in order to miniaturize the device, it is preferred to subject the glass substrate to chemical thinning. For that reason, in the glass substrate, it is preferred that a thinning rate is high. As an index of the thinning rate of the glass substrate, the HF weight loss value can be adopted.

When the HF weight loss value is 0.05 (mg/$cm^2$)/min or more, the productivity of the thinning step become satisfactory, and hence, such is preferred. When the HF weight loss value is 0.20 (mg/$cm^2$)/min or less, a failure, such as the matter that an etching depth of the glass substrate as generated in the thinning step becomes heterogeneous, whereby smoothness of the glass substrate surface is impaired, etc., can be prevented from occurring, and hence, such is preferred.

The HF weight loss value is more preferably 0.07 (mg/$cm^2$)/min or more, still more preferably 0.09 (mg/$cm^2$)/min or more, and especially preferably 0.11 (mg/$cm^2$)/min or more. In addition, the HF weight loss value is more preferably 0.18 (mg/$cm^2$)/min or less, still more preferably 0.16 (mg/$cm^2$)/min or less, and especially preferably 0.14 (mg/$cm^2$)/min or less.

In addition, the light selective transmission type glass as an embodiment of the present invention can be applied as an optical filter of a display device for projection application, for example, LCOS. In such a case, when a photoelastic constant of the glass substrate is high, the glass substrate has birefringence due to a stress generated in a packaging step of device or at the time of use of device. As a result, there is a concern that a color change is caused in the light coming into the device, thereby causing an image quality failure, such as color unevenness, etc.

In order to prevent such an image quality failure from occurring, in the glass substrate 12 as an embodiment of the present invention, a photoelastic constant is preferably 31 nm/(MPa·cm) or less, more preferably 30.5 nm/(MPa·cm) or less, still more preferably 30 nm/(MPa·cm) or less, and especially preferably 29.5 nm/(MPa·cm) or less.

In addition, in the glass substrate, an α-ray emitting quantity is preferably 0.5 C/$cm^2$·h or less, more preferably 0.3 C/$cm^2$·h or less, especially preferably 0.1 C/$cm^2$·h or less, and most preferably 0.05 C/$cm^2$·h or less. The unit C means the count number.

For example, the light selective transmission type glass as an embodiment of the present invention is applied to a cover glass of a solid-state imaging element. In this case, when an α-ray generated from the glass substrate comes into a solid-state imaging element, there is a concern that a hole-electron pair is induced by energy of the α-ray, resulting in occurrence of a soft error instantaneously generated in an image, such as a bright spot or a white spot. Then, by using a glass substrate with a small α-ray emitting quantity, such a failure is readily prevented from occurring. When a high-purity raw material with a small content of a radioactive isotope and a small α-ray emitting quantity is used as the raw material of the glass substrate, the α-ray emitting quantity can be decreased. In addition, in the melting/refining step of glass, by making a radioactive isotope not include into the molten glass from a furnace material or the like of glass manufacturing equipment, the α-ray emitting quantity can be effectively decreased. In addition, the "α-ray emitting quantity" can be measured by a gas flow proportional counter measuring apparatus or the like.

Next, the method for producing a glass substrate as an embodiment of the present invention is described.

In the case of producing the glass substrate as an embodiment of the present invention, a melting step of heating glass raw materials to obtain a molten glass, a refining step of removing bubbles from the molten glass, a forming step of forming the molten glass into a sheet-like shape to obtain a glass ribbon, and a cooling step of gradually cooling the glass ribbon to a room temperature state are included.

In the melting step, raw materials are prepared so as to have a composition of a glass sheet to be obtained, and the raw materials are continuously put into a melting furnace and heated preferably to approximately 1,450° C. to 1,650° C. to obtain a molten glass.

For the raw materials, oxides, carbonates, nitrates, hydroxides, halides such as chlorides, and so on can be used. In the case where the melting or refining step includes a step where the molten glass comes into contact with platinum, there is a case where minute platinum particles elute into the molten glass and are included as a impurity into the resulting glass sheet. However, the use of a nitrate raw material brings about an effect for preventing elution of this platinum impurity from occurring.

As the nitrate, strontium nitrate, barium nitrate, magnesium nitrate, calcium nitrate, and so on can be used. Use of strontium nitrate is more preferred. As for the particle size of the raw materials, from raw materials having a large particle diameter of several hundred microns to an extent of not causing an unmelted residue to raw materials having a small particle diameter of several microns to an extent that they are not scattered at the time of shipment of raw materials and are not coagulated as secondary particles can be properly used. It is also possible to use a granulated body. In order to prevent scattering of raw materials from occurring, it is also possible to properly regulate the moisture content of raw materials. Melting conditions, such as β-OH, oxidation-reduction degree or redox of Fe [$Fe^{2+}/(Fe^{2+}+Fe^{3+})$], etc., can be properly regulated and used.

Next, the refining step is a step of removing bubbles from the molten glass obtained in the above-described melting step. As the refining step, a degassing method by means of pressure reduction may be applied. In addition, in the glass substrate, $SO_3$ or $SnO_2$ can be used as a refining agent. As the $SO_3$ source, a sulfate of at least one element selected from Al, Mg, Ca, Sr, and Ba is preferred; a sulfate of an alkaline earth metal is more preferred; and above all, $CaSO_4 \cdot 2H_2O$, $SrSO_4$, and $BaSO_4$ are especially preferred because their action to make the bubbles large is remarkable.

As the refining agent in the degassing method by means of pressure reduction, it is preferred to use a halogen, such as Cl, F, etc. As the Cl source, a chloride of at least one element selected from Al, Mg, Ca, Sr, and Ba is preferred; a chloride of an alkaline earth metal is more preferred; and above all, $SrCl_2 \cdot 6H_2O$ and $BaCl_2 \cdot 2H_2O$ are especially preferred because not only their action to make the bubbles large is remarkable, but also their deliquescency is small. As the F source, a fluoride of at least one element selected from Al, Mg, Ca, Sr, and Ba is preferred; a fluoride of an alkaline earth metal is more preferred; and above all, $CaF_2$ is still more preferred because an action to make the solubility of the glass raw materials large is remarkable.

Next, the forming step is a step of forming the molten glass from which bubbles have been removed in the above-described refining step into a sheet-like shape to obtain a glass ribbon. As the forming step, the float process of forming a molten glass into a sheet-like shape by being flown onto a molten metal to obtain a glass ribbon is applied.

Next, the cooling step is a step of gradually cooling the glass ribbon obtained in the above-described forming step to a room temperature state. As for the cooling step, the glass ribbon is gradually cooled to a room temperature state such that an average cooling rate of from a temperature at which the viscosity is $10^{13}$ dPa·sec to a temperature at which the viscosity is $10^{14.5}$ dPa·sec becomes R. After cutting the gradually cooled glass ribbon, the glass substrate is obtained.

In the method for producing a glass substrate, the composition of the resulting glass substrate and the average cooling rate R (unit: °C./min) of the glass ribbon in the cooling step satisfy the following conditions (1) to (4).

{0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0344×$\log_{10}$ R} is 2.70 to 3.20.     Condition (1):

{0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+0.2180×(content of BaO)+0.0391×$\log_{10}$ R} is 3.13 to 3.63.     Condition (2):

{0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+0.2179×(content of BaO)+0.0312×$\log_{10}$ R} is 3.45 to 3.95.     Condition (3):

{0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+0.0013×(content of BaO)−0.0041×$\log_{10}$ R} is 1.20 to 1.30.     Condition (4):

Preferably, the following conditions (1) to (4) are satisfied.

{0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0344×$\log_{10}$ R} is 2.80 to 3.10.     Condition (1):

{0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+0.2180×(content of BaO)+0.0391×$\log_{10}$ R} is 3.23 to 3.53.     Condition (2):

{0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+0.2179×(content of BaO)+0.0312×$\log_{10}$ R} is 3.55 to 3.85.     Condition (3):

{0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+0.0013×(content of BaO)−0.0041×$\log_{10}$ R} is 1.24 to 1.27.     Condition (4):

Here, the content of $SiO_2$, the content of $Al_2O_3$, the content of $B_2O_3$, the content of MgO, the content of CaO, the content of SrO, and the content of BaO are respectively a content of each of the components contained in the resulting glass. When the conditions (1) to (4) are satisfied, it is possible to produce a glass substrate in which the residual strain generated in the silicon substrate and the glass substrate themselves in the heat treatment step can be made small.

In the above-described glass substrate as an embodiment of the present invention, since the content of the alkali metal oxide is 0.1% or less, in the heat treatment step of sticking the silicon substrate and the glass substrate to each other, an alkali ion is hardly diffused into the silicon substrate. In addition, since the average thermal expansion coefficient $\alpha_{50/100}$ at 50° C. to 100° C. is 2.70 ppm/° C. to 3.20 ppm/° C., the average thermal expansion coefficient $\alpha_{200/300}$ at 200° C. to 300° C. is 3.45 ppm/° C. to 3.95 ppm/° C., and the value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. is 1.20 to 1.30, the difference in thermal expansion coefficient from the silicon substrate is small, and the residual strain generated in the silicon substrate and the glass substrate is small.

The present invention is not limited to the above-described embodiments. Modifications, improvements, and the like within the range where the object of the present invention can be achieved are included in the present invention.

For example, in the case of producing a glass substrate according to the present invention, in the forming step, the molten glass may be formed into a sheet-like shape by applying the fusion process, the press forming process, or the like.

In addition, in the case of producing a glass substrate according to an embodiment of the present invention, a platinum crucible may be used. In the case of using a platinum crucible, in the melting step, raw materials are prepared so as to have a composition of a glass substrate to be obtained; a platinum crucible having the raw materials charged therein is put into an electric furnace and heated preferably to approximately 1,450° C. to 1,650° C.; a platinum stirrer is inserted; and stirring is performed for 1 to 3 hours to obtain a molten glass.

In the forming step, the molten glass is flown onto a carbon sheet to form a glass sheet. In the cooling step, the glass in a sheet form is gradually cooled to a room temperature state and then cut, thereby forming a glass substrate.

In addition, the glass substrate obtained after cutting may be heated to, for example, approximately (Tg+50° C.), followed by gradually cooling to a room temperature state. According to this way, the fictive viscosity η can be regulated.

(Light Selective Transmission Layer)

The light selective transmission layer 11 is a layer that selectively transmits at least one selected from the group consisting of near infrared rays, visible light rays, visible light rays of a blue wavelength region, visible light rays of a red wavelength region, and visible light rays of a green wavelength region, among near infrared rays and visible light rays. It is preferred that the light selective transmission layer 11 is a layer that selectively transmits three or less rays selected from the above-described group.

Specifically, the light selective transmission layer 11 has only to selectively transmit (1) near infrared rays, (2) visible light rays, (3) visible light rays of a blue wavelength region, (4) visible light rays of a red wavelength region, (5) visible light rays of a green wavelength region, (6) near infrared rays and visible light rays of a blue wavelength region, (7) near infrared rays, visible light rays of a blue wavelength region, and visible light rays of a red wavelength region, (8) near infrared rays, visible light rays of a blue wavelength region, and visible light rays of a green wavelength region, (9) near infrared rays and visible light rays of a red wavelength, (10) near infrared rays, visible light rays of a red wavelength, and visible light rays of a green wavelength region, (11) near infrared rays and visible light rays of a green wavelength region, (12) visible light rays of a blue wavelength region and visible light rays of a red wavelength region, (13) visible light rays of a blue wavelength region and visible light rays of a green wavelength region, or (14) visible light rays of a red wavelength region and visible light rays of a green wavelength region.

Here, the wavelength of each light is defined to be 780 nm to 1,200 nm for the near infrared rays; 380 nm to 780 nm for the visible light rays; 600 nm to 780 nm for the visible light rays of a red wavelength region; 500 nm to 600 nm for the visible light rays of a green wavelength region; and 380 nm to 500 nm for the visible light rays of a blue wavelength region, respectively.

In addition, it is meant by the terms "selectively transmits" that the layer transmits 80% or more of the light at maximum in terms of an external transmittance in each of the wavelength ranges. The external transmittance refers to a transmittance of the transmitted light other than components that are not transmitted by reflection or absorption among the incident lights and can be measured with a commercially available double-beam type near infrared/visible spectrophotometer. In addition, the external transmittance in a minute region can also be measured with a microspectrophotometer appended with a microscope.

As for the light selective transmission layer 11, in the case of an application for near infrared ray cut filter or an application for near infrared ray transmission filter, it is preferred that the light selective transmission layer 11 is configured of an absorption layer and/or a reflection layer. In the case of an application for color filter, it is preferred that the light selective transmission layer 11 is configured of an absorption layer.

The absorption layer may be, for example, formed of a layer containing an absorption dye that absorbs a light having a wavelength which is not desired to be transmitted and a transparent resin. Two or more kinds of absorption dyes may be contained.

The reflection layer may be, for example, formed of a dielectric multilayer film in which two or more dielectric thin films having a different refractive index from each other are laminated. The reflection layer reflects a light having a wavelength which is not desired to be transmitted due to a reflection action thereof, specifically an interference action of the dielectric multilayer film. The reflection layer is able to give sharper selective light-transmitting properties which are hardly realized by the absorption layer. For example, in the case of an application for near infrared ray cut filter, when the light selective transmission layer 11 is configured of a reflection layer, the visible light transmittance can be enhanced as compared with the case where the light selective transmission layer 11 is configured of an absorption layer.

The light selective transmission layer 11 may be divided into a rectangle, a polygon, or the like. The light absorption characteristics of each of the divided light selective transmission layers 11 may be different from each other so as to correspond to, for example, red, green, and blue lights. In addition, the light selective transmission layer 11 may also be divided by a light-shielding part, such as a black matrix, etc.

Figure 1B:
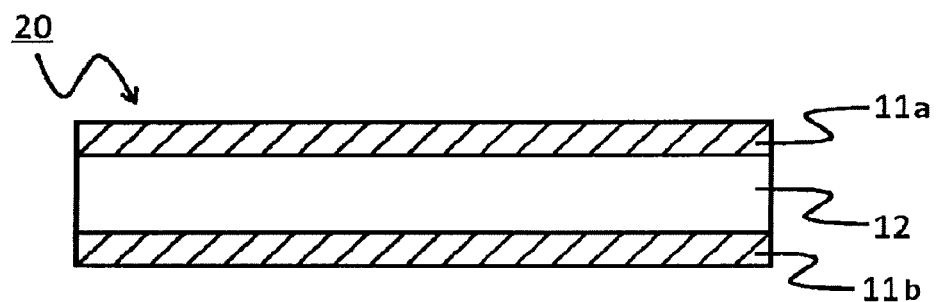
FIG. 1B is a cross-section view diagrammatically showing other example of a light selective transmission type glass.

FIG. 1B shows a light selective transmission type glass 20 in which light selective transmission layers 11a and 11b are formed on the both surfaces of the glass substrate 12. In FIG. 1B, the light selective transmission layers 11a and 11b may be the same as or different from each other in terms of selective light-transmitting characteristics.

In addition, in the case of an application for near infrared ray cut filter or an application for near infrared ray transmission filter, the light selective transmission type glass may be a configuration including, in addition to an absorption layer, a reflection layer including a dielectric multilayer film. For example, in the case of an application for near infrared ray cut filter, by including, in addition to an absorption layer, a reflection layer, a near ultraviolet light and a near infrared light which cannot be thoroughly shut off only by an absorption layer 111 can be shut off by a reflection action. Similarly, in the case of an application for near infrared ray transmission filter, near ultraviolet rays and visible light rays can be shut off.

Figure 1C:
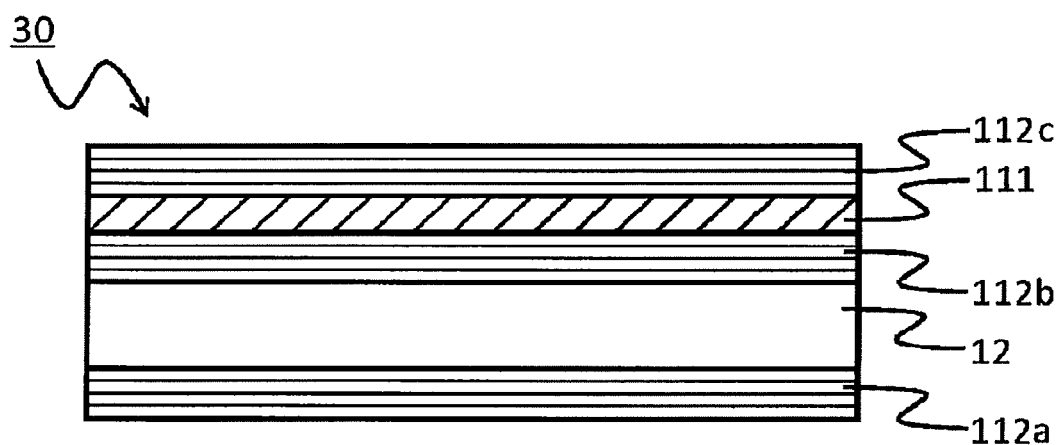
FIG. 1C is a cross-section view diagrammatically showing other example of a light selective transmission type glass.

FIG. 1C shows a light selective transmission type glass 30 in which in addition to a light selective transmission layer including the absorption layer 111, reflection layers 112a, 112b, and 112c are formed. In the light selective transmission type glass 30, the above-described reflection layers 112a and 112b may be included on one surface or/and both surfaces of the glass substrate 12, or the reflection layer 112c may be included on the surface of the light selective transmission layer including the absorption layer 111.

The light selective transmission type glass 30 may also include an antireflection film. In addition, in order to improve adhesion or reliability of the light selective transmission layer, the light selective transmission type glass 30 may be subjected to a surface treatment with a silane coupling agent or may include a dielectric film. One of the reflection layers 112a and 112c located on the surface of the light selective transmission type glass 30 is joined with the silicon substrate with an adhesive, and therefore, it may be designed taking into consideration a refractive index of the adhesive.

The light selective transmission type glass 30 is joined with the silicon substrate having formed thereon a solid-state imaging element, and disposed at a position adjacent to pixels. For that reason, if an impurity or a fine defect is present in the reflection layers 112a, 112b, and 112c, such may become directly a pixel defect. Thus, in many cases, a tolerance level of its size or number of generation is severer than that in a reflection layer in an optical filter of a non-joined type. In consequence, it is preferred that the light selective transmission type glass 30 includes the reflection layers 112a, 112b, and 112c according to a quality level.

In addition, when the light selective transmission type glass as an embodiment of the present invention also includes a function as a cover glass that protects a solid-state imaging element, miniaturization or thinning of an imaging unit can be expected. If the glass substrate contains, as an impurity, an α-ray emitting element (radioactive isotope), there is a concern that it emits the (x-ray to cause a soft error in the solid-state imaging element. Thus, it is suitable to use high-purity glass raw materials in which the content of α-ray emitting elements is low. As for the glass raw materials, among the α-ray emitting elements, the content of U and Th is preferably 20 ppb or less, and more preferably 5 ppb or less. In addition, the light selective transmission type glass may include a film that shields an α-ray on one surface adjacent to the solid-state imaging element.

(Specific Examples of Light Selective Transmission Layer)

Specific examples of the absorption layer and the reflection layer configuring the light selective transmission layer 11 are described.

As one example, an example in which the light selective transmission layer 11 includes an absorption layer that absorbs near infrared rays and transmits visible light rays is described.

The absorption layer that configures the light selective transmission layer 11 is a layer containing a near infrared ray absorption dye (A) as an absorption dye (hereinafter also referred to as "dye (A)") and a transparent resin (B), and typically a layer in which the dye (A) is uniformly dissolved or dispersed in the transparent resin (B). It is suitable that the light selective transmission layer 11 further contains a near ultraviolet ray absorption dye (U) (hereinafter also referred to as "dye (U)").

In the light selective transmission type glasses shown in FIGS. 1A to 1C, even in the case where the light selective transmission layer 11 (absorption layer 111) further contains the dye (U), the light selective transmission layer is illustrated such that it is configured of a single layer. However, it is not limited to this configuration. For example, in the case where the light selective transmission layer 11 contains the dye (A) and the transparent resin (B) but does not contain the dye (U), a near ultraviolet ray absorption layer which is not illustrated in FIGS. 1A to 1C may be separately provided. That is, the near ultraviolet ray absorption layer may be provided as an independent layer containing the dye (U) and the transparent resin.

In this case, the near ultraviolet ray absorption layer may be provided on the side of the light selective transmission layer 11 in the both main surfaces of the glass substrate 12, or may be provided on the side opposite to the side of the light selective transmission layer 11, and there is no restriction in a positional relation thereof. However, even in the configuration in which the near ultraviolet ray absorption layer is separately provided, in the light selective transmission type glass as an embodiment of the present invention, the same optical characteristics as the optical characteristics of the configuration in which the light selective transmission layer 11 further contains the dye (U) are obtained. In addition, even in the case where the light selective transmission layer 11 contains the dye (A) and the transparent resin (B) and further the dye (U), a near ultraviolet ray absorption layer containing the dye (U) and the transparent resin (B) may be separately provided. Hereinafter, in the case where the light selective transmission type glass as an embodiment of the present invention contains the dye (U), it is explained as a configuration in which the light selective transmission layer 11 contains the dye (U).

<Near Infrared Ray Absorption Dye (A)>

The dye (A) is not particularly limited so long as it has ability to transmit a light of a visible light region (wavelength: 380 nm to 780 nm) and to absorb a light of a near infrared ray region (wavelength: 780 nm to 1,200 nm). The dye in the present invention may also be a pigment, namely in a state where molecules are agglomerated.

Examples of the dye (A) include cyanine-based compounds, phthalocyanine-based compounds, naphthalocyanine-based compounds, dithiol metal complex-based compounds, diimonium-based compounds, polymethine-based compounds, phthalide-based compounds, naphthoquinone-based compounds, anthraquinone-based compounds, indophenol-based compounds, and squarylium-based compounds.

<Near Ultraviolet Ray Absorption Dye (U)>

The near ultraviolet ray absorption dye (U) is not particularly limited so long as it has ability to absorb a light having a wavelength of 430 nm or less.

Specific examples of the dye (U) include oxazole-based compounds, merocyanine-based compounds, cyanine-based compounds, naphthalimide-based compounds, oxadiazole-based compounds, oxazine-based compounds, oxazolidine-based compounds, naphthalic acid-based compounds, styryl-based compounds, anthracene-based compounds, cyclic carbonyl-based compounds, and triazole-based compounds.

The dye (A) is preferably contained in an amount of 0.1 to 30 parts by mass, more preferably contained in an amount of 0.5 to 25 parts by mass, and especially preferably contained in an amount of 1 to 20 parts by mass based on 100 parts by mass of the transparent resin (B) in the light selective transmission layer 11.

As for the content of the dye (U) in the light selective transmission layer 11, the dye (U) is preferably contained in an amount of 0.01 to 30 parts by mass, more preferably contained in an amount of 0.05 to 25 parts by mass, and especially preferably contained in an amount of 0.1 to 20 parts by mass based on 100 parts by mass of the transparent resin (B).

In addition, the light selective transmission layer 11 may contain, in addition to the dye (A) and the transparent resin (B) as well as the dye (U) as an arbitrary component, a light absorber, a color tone correcting dye, a near ultraviolet ray absorber, a leveling agent, an antistatic agent, a heat stabilizer, a photostabilizer, an antioxidant, a dispersant, a flame retardant, a lubricant, a plasticizer, and so on. In addition, examples of a component which is added in a coating solution to be used on the occasion of forming the light selection transmission layer 11 as described later include a silane coupling agent, a heat or photopolymerization initiator, a polymerization catalyst, and the like. As for the content of such other arbitrary components in the absorption layer, it is preferred that each of such other arbitrary components is contained in an amount of 15 parts by mass or less based on 100 parts by mass of the transparent resin (B).

A film thickness of the light selection transmission layer 11 is preferably 0.1 μm to 10 μm. When the film thickness is less than 0.1 μm, there is a concern that the light absorption ability cannot be thoroughly revealed. In addition, when the film thickness is more than 10 μm, there is a concern that flatness of the film is lowered, and scattering of the absorptivity is generated. The film thickness is more preferably 1 μm to 10 μm. When the film thickness falls within this range, it is possible to make both sufficient light absorption ability and flatness in film thickness compatible with each other. Even in the case where the near ultraviolet ray absorption layer is separately provided, the film thickness of the near ultraviolet ray absorption layer may satisfy the above-described range.

The light selective transmission layer 11 can be, for example, produced by coating on the glass substrate 12 a coating solution prepared by dispersing and dissolving the dye (A) and the transparent resin (B) or raw material components of the transparent resin (B) and further, optionally the dye (U), in a solvent and drying, and further curing as the need arises. By subjecting the light selective transmission layer 11 to film formation by such a method, the light selective transmission layer 11 can be uniformly produced in a desired film thickness. In the case where the light selective transmission layer 11 contains the above-described arbitrary components, the coating solution contains the foregoing arbitrary components.

By coating the above-described coating solution on the glass substrate 12 and then drying, the light selective transmission layer 11 is formed on the glass substrate 12. In the case where the coating solution contains the raw material components of the transparent resin (B), a curing treatment is further performed. In the case where the reaction is heat curing, drying and curing can be simultaneously performed, whereas in the case of photo-curing, a curing treatment is provided separately from drying.

<Transparent Resin (B)>

Specifically, examples of the transparent resin (B) include acrylic resins, epoxy resins, ene/thiol resins, polycarbonate resins, polyether resins, polyacrylate resins, polysulfone resins, polyether sulfone resins, a poly-p-phenylene resins, polyarylene ether phosphine oxide resins, polyimide resins, polyamide-imide resins, polyolefin resins, cyclic olefin resins, and polyester resins. As the transparent resin (B), these resins may be used alone, or may be used in admixture of two or more thereof.

As other example, an example in which the light selective transmission layer 11 includes a reflection layer that reflects near infrared rays and transmits visible light rays is described.

The reflection layer that configures the light selective transmission layer 11 is formed of a dielectric multilayer film as described above. For example, the reflection layer is formed of a dielectric multilayer film having a high-refractive index layer having a refractive index of 2.0 or more and a low-refractive index layer having a refractive index of 1.7 or less. The high-refractive index layer can be selected from $TiO_2$, $Nb_2O_5$, and $Ta_2O_5$, or composite oxides thereof. The low-refractive index layer can be selected from $SiO_2$, $MgF_2$, and $Al_2O_3$, or composite oxides thereof.

As shown in FIG. 1B, the light selective transmission layer 11 (reflection layer) may be provided on the both surfaces of the glass substrate. In the light selective transmission layer 11 including a dielectric multilayer film, since several ten layers of optical thin films are laminated on the glass substrate, in particular, in the case where the thickness of the glass substrate is thin, there is a case where a warpage of the glass substrate is generated due to a film stress. However, by subjecting the dielectric multilayer film to film formation on the both surfaces of the glass substrate such that the film stresses of the both surfaces of the glass substrate are substantially equal to each other, the warpage can be relieved.

As for a basic design of the film thickness of the dielectric multilayer film that configures the light selective transmission layer 11 (reflection layer), it is general to include alternately repetitive layers in which the high-refractive index layer and the low-refractive index layer are alternately laminated in the same optical film thickness, respectively. The alternately repetitive layers are expressed as "(1H, 1L)S". Here, a wavelength near the center of a wavelength which is intended to be cut is defined as a designed wavelength λ; a film thickness of the high-refractive index layer (H) is expressed as 1H in terms of a value of an optical film thickness nd=¼λ; and a film thickness of the low-refractive index layer (L) is similarly expressed as 1L. S is the repetition number called the stack number and expresses that the configuration within the parenthesis is periodically repeated.

A specified wavelength to be cut is determined by the alternately repetitive layers. When the value of S becomes large, fall characteristics (steepness) of change of from absorption to transmission become sharp. Therefore, for example, in an optical film for sensitivity correction (near infrared ray cut filter), in order to make the fall characteristics gentle, it is preferred to undergo the lamination in such a manner that the value of S is selected from a range of from about 2 to 7, and the thickness of the alternately repetitive layers of the usual basic design is varied little by little.

In order to increase the transmittance of a transmission band and to convert unevenness of the light transmittance called "ripple" into flat characteristics, an optimum design is performed by varying the film thickness of some layers near the glass substrate and near the medium of the alternately repetitive layers. For that reason, it is expressed as "substrate |0.5L, 1H . . . HL(HL)s, HL . . . H, 0.5L". In addition, in the case where $TiO_2$ or the like is used for the high-refractive index layer, in many cases, instead of using the high-refractive index layer as a final layer for the outermost layer, the design is made such that $SiO_2$ having more excellent environmental resistance characteristics is supplemented in the outermost layer. Even in the layer coming into contact with the glass substrate, $TiO_2$ reacts with the glass substrate, whereby the characteristics are likely deteriorated. Therefore, there is a case of supplementing chemically stable $SiO_2$ in the first layer. The design of the light selective transmission layer 11 due to such a multilayer film can be theoretically made using a commercially available software (see, for example, OPTRONICS 1999, No. 5, pp. 175-190).

As a specific structure of the near infrared ray cut filter, in the case where $SiO_2$ (n=1.46) is selected for the low-refractive index layer, $Ta_2O_5$ (n=2.1) is selected for the high-refractive index layer, and the designed wavelength λ is set to 755 nm, the following laminated structure made of 40 layers can be exemplified.

1.17H, 1.13L, (0.95H, 0.99L)4, (1.05H, 1.1L)4, (1.18H, 1.22L)2, (1.25H, 1.28L)3, (1.33H, 1.34L)5, 1.16H, 0.59L

For the film formation of the high-refractive index layer and the low-refractive index layer alternately on the glass substrate, the physical film formation method is general, and it is possible to apply the usual vacuum deposition method. However, the ion assisted deposition method, the ion plating method, or the sputtering method is preferred because it is possible to stably control the refractive index of the film, and a film which is small in a change with time of spectral characteristics due to storage or use environmental changes can be prepared.

(Laminated Substrate)

Figure 2:
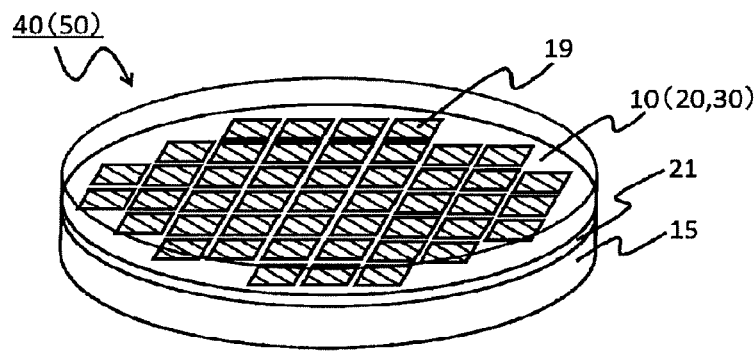
FIG. 2 is a perspective view diagrammatically showing an example of a laminated substrate.

Furthermore, the present invention provides a laminated substrate in which a silicon substrate and a light selective transmission type glass are joined with each other. For example, a laminated glass in which a silicon substrate in which plural solid-imaging elements for producing a camera module are formed and a light selective transmission type glass are joined with each other is provided. FIG. 2 is a perspective view diagrammatically showing an example of a laminated substrate 40 (50) in which the light selective transmission glass 10 (20, 30) as an embodiment of the present invention and a silicon substrate 15 in which plural solid-state imaging elements 19 are formed thereon are joined with each other.

Figure 3A:
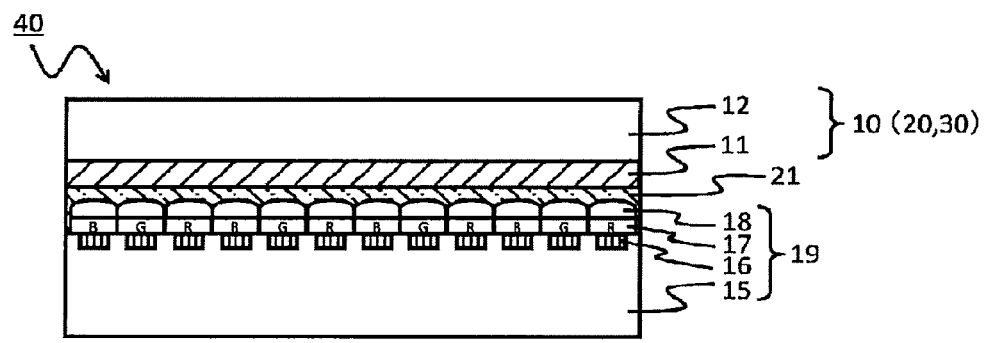
FIG. 3A is an enlarged view of a cross section diagrammatically showing an example of a laminated substrate.
Figure 3B:
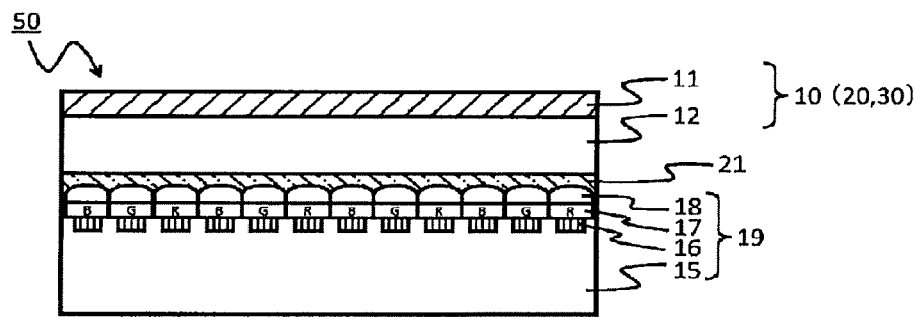
FIG. 3B is an enlarged view of a cross section diagrammatically showing other example of a laminated substrate.

FIG. 3A and FIG. 3B are each a cross-sectional schematic view enlarging the periphery of the solid-state imaging element 19 of the laminated substrate 40 (50) in which the light selective transmission type glass 10 (20, 30) as an embodiment of the present invention is integrated with the solid-state imaging element 19. In the solid-state imaging element 19, Si semiconductor (CMOS or CCD) photodetector arrays 16 are formed on one surface of the silicon substrate 15, and an RGB mosaic color filter 17 and a resin microlens 18 are formed in every pixel. As for the solid-state imaging element 19, the silicon substrate 15 and the light selective transmission type glass 10 (20, 30) are integrated with each other via an adhesive 21, thereby facilitating the laminated substrate 40 (50).

The laminated substrate 40 shown in FIG. 3A has a configuration in which the light sensitive transmission type glass 10 (20, 30) on the side of the light sensitive transmission layer 11 is integrated with the solid-state imaging element 19 via the adhesive 21. On the other hand, the laminated substrate 50 shown in FIG. 3B has a configuration in which the light selective transmission layer 11 faces on the air side, and the light sensitive transmission type glass 10 (20, 30) on the opposite side to the light sensitive transmission layer 11 is integrated with the solid-state imaging element 19 via the adhesive 21. Any material is usable for the adhesive 21 so long as it is a transparent material with respect to the visible light. In the laminated substrate, the disposition of the light selective transmission layer 11 may be either the side of the solid-state imaging element 19 (FIG. 3A) or the air side (FIG. 3B). In view of the fact that the absorption layer is soft as compared with the glass substrate so that it is liable to be scratched, in the case where the light selective transmission layer 11 is composed of a single layer, when such a layer is disposed on the joint surface side of the solid-state imaging element 19, the resulting light selective transmission layer 11 is hardly scratched in the subsequent production process.

The laminated substrate 50 is also of a configuration obtained by a step of after joining the glass substrate 12 with the silicon substrate 15, forming the light selective transmission layer 11 on the surface of the glass substrate 12. That is, as for the laminated substrate 50, even if the order of the formation of the light selective transmission layer 11 and the joining of the glass substrate and the solid-state imaging element is left out of consideration, the same configuration is obtained.

In the solid-state imaging element 19, the resin microlens 18 has a function as a convex lens that condenses the incident light on the light-receiving plane of the photodetector array 16. For that reason, a refractive index $n_{ML}$, of a transparent resin which is used for the resin microlens 18 and a refractive index $n_G$ of the adhesive 21 satisfy a relation of $(n_{ML} > n_G)$, and it is preferred that a refractive index difference $(n_{ML}, -n_G)$ is larger. Specifically, $n_{ML}$ is preferably 1.8 or more, and more preferably 1.9 or more. In addition, $n_G$ is preferably 1.5 or less, and more preferably 1.45 or less.

Although the adhesive 21 may be either a UV curing type or a thermosetting type, a UV curing type is preferred from the standpoint of obtaining an adhesive strength for a short time. As for the UV curing type adhesive, sufficient adhesive strength between the surface of the resin microlens 18 and the glass surface or absorption layer surface of the light selective transmission type glass 10 (20, 30) can be obtained. As the adhesive 21, a material in which a rate of shrinkage by polymerization at the time of curing is 3% or less, a positional deviation or reduction of adhesive force due to surrounding environmental conditions, such as high-temperature high-humidity, abrupt temperature change, etc., is small, a halogen content is low, and an outgas due to unreacted components after curing is small, is preferred.

As for joining with adhesive 21, the adhesive before curing is coated on the light selective transmission type glass 10 (20, 30) and integrated in a uniform film thickness of 10 μm or less between the light selective transmission type glass and the solid-state imaging element 19, thereby obtaining the laminated substrate 40 (50). In the case of using a UV curing type adhesive, the adhesive 21 may be polymerized and cured upon irradiation with ultraviolet rays from the side of the light selective transmission type glass 10 (20, 30). In addition, in the case of using a thermosetting type adhesive, the adhesive 21 may be polymerized and cured by heating the whole of the laminated substrate 50.

In the case where in a curing process of the adhesive 21, the light selective transmission layer 11 does not transmit ultraviolet rays or is denatured by the heat treatment, after adhesion between the glass substrate 12 and the solid-state imaging element 19, the light selective transmission layer 11 may be formed on the surface of the glass substrate 12.

In addition, in each of the laminated substrates shown in FIG. 3A and FIG. 3B, electrical wirings for voltage impression and electrical signal extraction are omitted. Actually, in the case of a back-surface irradiation type CMOS solid-state imaging element capable of suppressing a reduction of sensitivity to be caused due to miniaturization of pixels, there is exemplified an example in which an electrical wiring is disposed on the opposite side of the silicon substrate 15 to the photodetector array 16, and an electrode is drawn out on the back surface of the solid-state imaging element by means of a technology of a through-electrode, etc. of the silicon substrate 15.

Figure 5:
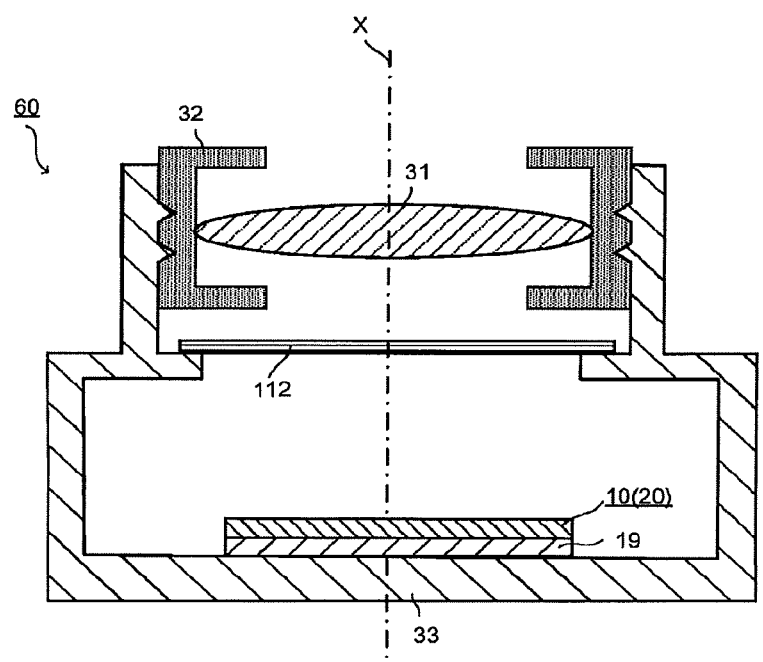
FIG. 5 is a cross-sectional view diagrammatically showing a principal part of an example of a camera module.

The laminated substrate 40 (50) is cut into a size of the solid-state imaging element 19 by using a dicing unit or the like and mounted on the solid-state imaging unit. FIG. 5 is a cross-sectional view diagrammatically showing a principal part of a solid-state imaging unit 60. The solid-state imaging unit 60 includes the solid-state imaging element 19 having the light selective transmission type glass 10 (20) joined therewith; and in front thereof, a reflection layer 112, an imaging lens 31, and a casing 33 for fixing them. The imaging lens 31 is fixed by a lens unit 32 provided inside the casing 33. The reflection layer 112 includes a dielectric multilayer film on one surface or both surfaces of a transparent substrate and is disposed in an optical path between the incident side of light of the lens unit 32 and the solid-state imaging element 19. In the solid-state imaging unit 60 shown in FIG. 5, an example in which the reflection layer 112 is disposed between the lens unit 32 and the light selective transmission type glass 10 (20) is shown. However, the solid-state imaging unit 60 is not limited to this example but may be configured such that the dielectric multilayer film of the reflection layer 112 is formed on the surface of the imaging lens 31.

In this way, in the laminated substrate 40 (50) as an embodiment of the present invention, an optical filter function can be installed in a wafer level into the solid-state imaging element 19, and therefore, not only the productivity is improved, but also stabilization of the characteristics is obtained. Furthermore, by integrating the conventional optical filter function into the solid-state imaging element 19 or the imaging lens 31 and reducing the number of optical filter parts, not only assembly and adjustment of a camera module are simplified, but also it becomes possible to miniaturize the solid-state imaging unit.

In addition, the laminated substrate according to an embodiment of the present invention is configured through lamination of the light selective transmission type glass and the silicon substrate, and a difference $\Delta\alpha_{50/100}$ ($=\alpha_{50/100}-\alpha_{Si50/100}$) between the average thermal expansion coefficient $\alpha_{50/100}$ at 50° C. to 100° C. of the glass substrate and the average thermal expansion coefficient $\alpha_{50/100}$ at 50° C. to 100° C. of the silicon substrate is −0.25 ppm/° C. to 0.25 ppm/° C.

In addition, a difference $\Delta\alpha_{200/300}$ ($=\alpha_{200/300}-\alpha_{Si200/300}$) between the average thermal expansion coefficient $\alpha_{200/300}$ at 200° C. to 300° C. of the glass substrate and the average thermal expansion coefficient $\alpha_{Si200/300}$ at 200° C. to 300° C. of the silicon substrate is −0.25 ppm/° C. to 0.25 ppm/° C. Since the difference in thermal expansion coefficient between the silicon substrate and the glass substrate is small, in the heat treatment step of sticking the silicon substrate and the glass substrate to each other, the residual strain generated in the silicon substrate is small.

$\Delta\alpha_{50/100}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{50/100}$ is more preferably 0.15 ppm/° C. or less, still more preferably 0.10 ppm/° C. or less, especially preferably 0.05 ppm/° C. or less, and most preferably 0.03 ppm/° C. or less.

$\Delta\alpha_{200/300}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{200/300}$ is more preferably 0.15 ppm/° C. or less, still more preferably 0.10 ppm/° C. or less, especially preferably 0.05 ppm/° C. or less, and most preferably 0.03 ppm/° C. or less.

In addition, a difference between $\Delta\alpha_{200/300}$ and $\Delta\alpha_{50/100}$ ($\Delta\alpha_{200/300}-\Delta\alpha_{50/100}$) is −0.16 ppm/° C. to 0.16 ppm/° C. When ($\Delta\alpha_{200/300}-\Delta\alpha_{50/100}$) is −0.16 ppm/° C. to 0.16 ppm/° C., since the difference in thermal expansion coefficient from the silicon substrate is small, in the heat treatment step of sticking the silicon substrate and the glass substrate to each other, the residual strain generated in the silicon substrate is small. ($\Delta\alpha_{200/300}-\Delta\alpha_{50/100}$) is preferably −0.12 ppm/° C. or more, and more preferably −0.08 ppm/° C. or more. In addition, ($\Delta\alpha_{200/300}-\Delta\alpha_{50/100}$) is preferably 0.12 ppm/° C. or less, and more preferably 0.08 ppm/° C. or less.

In addition, the content of the alkali metal oxide in the glass substrate is 0% to 0.1% as expressed in terms of a molar percentage based on oxides.

In the laminated substrate according to an embodiment of the present invention, a difference $\Delta\alpha_{100/200}$ ($=\alpha_{100/200}-\alpha_{Si100/200}$) between the average thermal expansion coefficient $\alpha_{100/200}$ at 100° C. to 200° C. of the glass substrate and the average thermal expansion coefficient $\alpha_{Si100/200}$ at 100° C. to 200° C. of the silicon substrate is preferably −0.25 ppm/° C. to 0.25 ppm/° C. When $\Delta\alpha_{100/200}$ is −0.25 ppm/° C. to 0.25 ppm/° C., since the difference in thermal expansion coefficient between the silicon substrate and the glass substrate is small, in the heat treatment step of sticking the silicon substrate and the glass substrate to each other, the residual strain generated in the silicon substrate is small.

$\Delta\alpha_{100/200}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{100/200}$ is more preferably 0.15 ppm/° C. or less, still more preferably 0.10 ppm/° C. or less, especially preferably 0.05 ppm/° C. or less, and most preferably 0.03 ppm/° C. or less.

EXAMPLES

The present invention is hereunder described in more detail by reference to the Examples.

Test Example 1

In Tables 1 to 7, suitable glass compositions for the glass substrate as an embodiment of the present invention are shown. It should be construed that the present invention is not limited to the compositions of the present Examples so long as the functions of the present invention are revealed.

Various glass raw materials, such as silica sand, etc., were compounded so as to have a glass composition as shown in each of Tables 1 to 7, 0.1% to 1% of a sulfate as converted into $SO_3$, 0.16% of F, and 1% of Cl as expressed in terms of a molar percentage based on oxides relative to 100% of the raw materials of the objective composition were added, and the contents were melted for 3 hours under heating at a temperature of 1,550° C. to 1,650° C. by using a platinum crucible. In the melting, a platinum stirrer was inserted, and stirring was performed for 1 hour to achieve homogenization of glass. Subsequently, the molten glass was flown out and formed into a sheet-like shape; thereafter, the glass in a sheet-like shape was put into an electric furnace at a temperature of approximately (Tg+50° C.); and the electric furnace was subjected to temperature decrease at a cooling rate R (° C./min) and cooled until the glass reached room temperature.

With respect to the resulting glasses, a density (unit: g/cm$^3$), an average thermal expansion coefficient (unit: ppm/° C.), a glass transition point (unit: ° C.), a Young's modulus (unit: GPa), $T_2$ (unit: ° C.), $T_4$ (unit: ° C.), a devitrification temperature (unit: ° C.), a devitrification viscosity $\log_{10} \eta_{TL}$ (unit: dPa·sec), and a fictive viscosity $\log_{10} \eta$ (unit: dPa·sec) were measured and shown in Tables 1 to 7. In addition, (1) to (4) shown in Tables 1 to 7 are as follows.

$$0.0177 \times (\text{content of SiO}_2) - 0.0173 \times (\text{content of Al}_2\text{O}_3) + 0.0377 \times (\text{content of B}_2\text{O}_3) + 0.0771 \times (\text{content of MgO}) + 0.1543 \times (\text{content of CaO}) + 0.1808 \times (\text{content of SrO}) + 0.2082 \times (\text{content of BaO}) + 0.0344 \times (12.3 + \log_{10} 60 - \log_{10} \eta) \quad (1):$$

$$0.0181 \times (\text{content of SiO}_2) + 0.0004 \times (\text{content of Al}_2\text{O}_3) + 0.0387 \times (\text{content of B}_2\text{O}_3) + 0.0913 \times (\text{content of MgO}) + 0.1621 \times (\text{content of CaO}) + 0.1900 \times (\text{content of SrO}) + 0.2180 \times (\text{content of BaO}) + 0.0391 \times (12.3 + \log_{10} 60 - \log_{10} \eta) \quad (2)$$

$$0.0177 \times (\text{content of SiO}_2) + 0.0195 \times (\text{content of Al}_2\text{O}_3) + 0.0323 \times (\text{content of B}_2\text{O}_3) + 0.1015 \times (\text{content of MgO}) + 0.1686 \times (\text{content of CaO}) + 0.1990 \times (\text{content of SrO}) + 0.2179 \times (\text{content of BaO}) + 0.0312 \times (12.3 + \log_{10} 60 - \log_{10} \eta) \quad (3):$$

$$0.0111 \times (\text{content of SiO}_2) + 0.0250 \times (\text{content of Al}_2\text{O}_3) + 0.0078 \times (\text{content of B}_2\text{O}_3) + 0.0144 \times (\text{content of MgO}) + 0.0053 \times (\text{content of CaO}) + 0.0052 \times (\text{content of SrO}) + 0.0013 \times (\text{content of BaO}) - 0.0041 \times (12.3 + \log_{10} 60 - \log_{10} \eta) \quad (4):$$

The values in the parentheses in the tables are those determined through calculations. The residual amount of $Fe_2O_3$ in the glass was 50 ppm to 200 ppm as expressed in terms of parts per million mass based on oxides, and the residual amount of $SO_3$ in the glass was 10 ppm to 100 ppm as expressed in terms of parts per million mass based on oxides. Measurement methods of respective physical properties are shown as follows.

(Average Thermal Expansion Coefficient)

The average thermal expansion coefficient was measured with a differential thermal expansion meter (TMA) in accordance with the method prescribed in JIS R3102 (1995). The measurement temperature range of $\alpha_{50}/\alpha_{100}$ is from 50° C. to 100° C., the measurement temperature range of $\alpha_{100}/\alpha_{200}$ is from 100° C. to 200° C., and the measurement temperature range of $\alpha_{200}/\alpha_{300}$ is from 200° C. to 300° C. The unit is expressed as ppm/° C.

(Difference in Average Thermal Expansion Coefficient from Silicon Substrate)

With respect to a silicon substrate (manufactured by Shin-Etsu Chemical Co., Ltd.), average thermal expansion coefficients $\alpha_{Si50/100}$, $\alpha_{Si100/200}$, and $\alpha_{Si200/300}$ were measured, and respective differences in average thermal expansion coefficient $\Delta\alpha_{50/100}$, $\Delta\alpha_{100/200}$, and $\Delta\alpha_{200/300}$ from the glass substrate were determined. Here, $\Delta\alpha_{50/100}$, $\Delta\alpha_{100/200}$, and $\Delta\alpha_{200/300}$ are as follows.

$$\Delta\alpha_{50/100} = \alpha_{50/100} - \alpha_{Si50/100}$$

$$\Delta\alpha_{100/200} = \alpha_{100/200} - \alpha_{Si100/200}$$

$$\Delta\alpha_{200/300} = \alpha_{200/300} - \alpha_{Si200/300}$$

The average thermal expansion coefficients $\alpha_{Si50/100}$, $\alpha_{Si100/200}$, and $\alpha_{Si200/300}$ of the silicon substrate were 2.94 ppm/° C., 3.37 ppm/° C., and 3.69 ppm/° C., respectively.

(Glass Transition Point Tg)

The measurement was performed with TMA in accordance with the method prescribed in JIS R3103-3 (2001).

(Density)

About 20 g of a bubble-free glass lump was measured by the Archimedean method.

(Young's Modulus)

A glass having a thickness of 0.5 mm to 10 mm was measured by the ultrasonic pulse method.

($T_2$)

A viscosity was measured with a rotary viscometer, and a temperature $T_2$ (° C.) at which the viscosity reached $10^2$ dPa·sec was measured.

($T_4$)

A viscosity was measured with a rotary viscometer, and a temperature $T_4$ (° C.) at which the viscosity reached $10^4$ dPa·sec was measured.

(Glass Devitrification Temperature)

The glass devitrification temperature is one obtained in the following manner. That is, pulverized glass particles are put in a platinum-made dish and heat treated for 17 hours in an electric furnace controlled at a fixed temperature; after the heat treatment, the observation with an optical microscope is performed; and an average value between a maximum temperature at which a crystal is precipitated in the inside of the glass and a minimum temperature at which a crystal is not precipitated is defined as the devitrification temperature.

(Devitrification Viscosity)

A coefficient of the Fulcher's equation was determined from the measurement results of glass viscosity of the molten glass at high temperatures (1,000° C. to 1,600° C.) by using a rotary viscometer, and the glass viscosity at the glass devitrification temperature was determined from the Fulcher's equation using the coefficient.

(HF Weight Loss Value)

The HF weight loss value was measured in the following manner. A glass sheet obtained above was cut, and the both surfaces thereof were subjected to mirror polishing to obtain a glass sample of 40 mm in square and having a thickness of 1 mm. This glass sample was cleaned and then dried, and a weight thereof was measured. Subsequently, the glass sample was dipped in a 5 mass % hydrofluoric acid kept at 25° C. for 20 minutes, cleaned, and then dried. The weight after dipping was measured, and the weight loss value was calculated from the weight before dipping. If a chemical liquid is stirred during dipping, an etching rate fluctuates. Therefore, stirring was not carried out. A surface area was calculated from the sample dimensions, and the weight loss value was divided by the surface area and further divided by the dipping time, thereby determining the weight loss value (HF weight loss value) per unit area and unit time.

(Photoelastic Constant)

The measurement was performed by the circular plate compression method ("Measurement of Photoelastic Constant of Glass for Chemical Strengthening by Method of Compression on Circular Plate", Ryosuke Yokota, Journal of Ceramic Society of Japan, 87[10], 1979, p. 519-522).

TABLE 1

| | | Example 1 | Example 2 | Example 3 | Example 4 | Example 5 | Example 6 | Example 7 | Example 8 |
|---|---|---|---|---|---|---|---|---|---|
| Composition (mol %) | $SiO_2$ | 70.0 | 65.9 | 68.0 | 68.0 | 68.0 | 66.8 | 66.7 | 68.0 |
| | $Al_2O_3$ | 12.0 | 12.9 | 13.0 | 13.0 | 13.0 | 13.0 | 12.9 | 12.5 |
| | $B_2O_3$ | 2.4 | 6.2 | 4.7 | 5.8 | 6.4 | 4.6 | 4.4 | 4.0 |
| | MgO | 8.0 | 8.0 | 6.0 | 4.2 | 3.6 | 8.0 | 9.0 | 8.0 |
| | CaO | 5.6 | 4.0 | 5.3 | 5.0 | 5.0 | 6.6 | 6.0 | 6.5 |

TABLE 1-continued

|  |  |  |  |  |  |  |  |  |  |
|---|---|---|---|---|---|---|---|---|---|
|  | SrO | 2.0 | 3.0 | 3.0 | 4.0 | 4.0 | 1.0 | 1.0 | 1.0 |
|  | BaO | 0.0 | 0.0 | 0.0 | 0.0 | 0.0 | 0.0 | 0.0 | 0.0 |
|  | ZnO | 0 | 0.0 | 0.0 | 0.0 | 0.0 | 0.0 | 0.0 | 0.0 |
|  | CaO + SrO + BaO | 7.6 | 7.0 | 8.3 | 9.0 | 9.0 | 7.6 | 7.0 | 7.5 |
| Cooling rate (° C./min) |  | 1 | 1 | 1 | 1 | 1 | 1 | 1 | 1 |
| Average thermal expansion coefficient (ppm/° C.) | $\alpha_{50/100}$ | 2.91 | 2.95 | 2.97 | 2.91 | 3.00 | 2.91 | 2.94 |  |
|  | $\alpha_{100/200}$ | 3.35 | 3.36 | 3.39 | 3.36 | 3.38 | 3.38 | 3.37 |  |
|  | $\alpha_{200/300}$ | 3.69 | 3.66 | 3.70 | 3.68 | 3.67 | 3.69 | 3.66 |  |
|  | $\alpha_{200/300}/\alpha_{50/100}$ | 1.27 | 1.24 | 1.25 | 1.26 | 1.22 | 1.27 | 1.25 |  |
| Difference in average thermal expansion coefficient from silicon substrate (ppm/° C.) | $\Delta\alpha_{50/100}$ | −0.04 | 0.01 | 0.03 | −0.03 | 0.06 | −0.03 | −0.01 |  |
|  | $\Delta\alpha_{100/200}$ | −0.02 | 0.00 | 0.02 | −0.01 | 0.01 | 0.01 | 0.00 |  |
|  | $\Delta\alpha_{200/300}$ | 0.00 | −0.03 | 0.01 | −0.01 | −0.02 | 0.00 | −0.03 |  |
|  | $\Delta\alpha_{200/300} - \Delta\alpha_{50/100}$ | 0.04 | −0.04 | −0.01 | 0.02 | −0.08 | 0.03 | −0.02 |  |
| Fictive viscosity $\log_{10}\eta$ (dPa · sec) |  | 14.1 | 14.1 | 14.1 | 14.1 | 14.1 | 14.1 | 14.1 | 14.1 |
| (1) |  | 2.97 | 2.96 | 2.98 | 3.01 | 2.99 | 2.95 | 2.92 | 2.94 |
| (2) |  | 3.39 | 3.39 | 3.39 | 3.41 | 3.38 | 3.38 | 3.37 | 3.36 |
| (3) |  | 3.71 | 3.71 | 3.71 | 3.71 | 3.67 | 3.71 | 3.70 | 3.68 |
| (4) |  | 1.25 | 1.25 | 1.25 | 1.23 | 1.23 | 1.26 | 1.25 | 1.25 |
| Density (g/cm³) |  | (2.49) | (2.49) | (2.49) | (2.49) | (2.48) | 2.47 | (2.48) | (2.47) |
| Glass transition point Tg (° C.) |  | 768 | 746 | 754 | 747 | 746 | 754 | 753 | (758) |
| Young's modulus (GPa) |  | (84.2) | (80.6) | (81.1) | (78.4) | (77.5) | 84.6 | (84.1) | (83.5) |
| $T_2$ (° C.) |  | 1704 | (1643) | (1680) | (1689) | (1691) | 1647 | (1647) | (1669) |
| $T_4$ (° C.) |  | 1334 | (1279) | (1308) | (1312) | (1312) | 1295 | (1284) | (1298) |
| Devitrification temperature (° C.) |  | 1310 | 1295 | 1285 | 1295 | 1295 | 1305 | 1285 |  |
| Devitrification viscosity $\log_{10}\eta_{TL}$ (dPa · sec) |  | 4.1 | 3.9 | 4.2 | 4.1 | 4.1 | 3.9 | 4.0 |  |
| HF weight loss value ((mg/cm²)/min) |  | (0.10) | (0.15) | (0.12) | (0.13) | (0.12) | 0.13 | (0.14) | (0.12) |
| Photoelastic constant (nm/(MPa · cm) |  | (28.9) | (30.1) | (29.8) | (30.6) | (30.9) | 28.9 | (29.3) | (29.5) |

|  |  |  | Example 9 | Example 10 | Example 11 | Example 12 | Example 13 |
|---|---|---|---|---|---|---|---|
| Composition (mol %) | SiO₂ |  | 64.4 | 66.6 | 72.0 | 69.9 | 69.0 |
|  | Al₂O₃ |  | 13.0 | 12.9 | 13.5 | 10.3 | 11.0 |
|  | B₂O₃ |  | 8.5 | 5.6 | 0.0 | 1.5 | 2.2 |
|  | MgO |  | 7.1 | 7.7 | 6.0 | 13.0 | 12.0 |
|  | CaO |  | 4.0 | 6.2 | 5.5 | 5.3 | 5.8 |
|  | SrO |  | 3.0 | 1.0 | 1.0 | 0.0 | 0.0 |
|  | BaO |  | 0.0 | 0.0 | 2.0 | 0.0 | 0.0 |
|  | ZnO |  | 0.0 | 0.0 | 0.0 | 0.0 | 0.0 |
|  | CaO + SrO + BaO |  | 7.0 | 7.2 | 8.5 | 5.3 | 5.8 |
| Cooling rate (° C./min) |  |  | 1 | 1 | 1 | 1 | 1 |
| Average thermal expansion coefficient (ppm/° C.) | $\alpha_{50/100}$ |  | 2.93 | 2.89 |  |  |  |
|  | $\alpha_{100/200}$ |  | 3.35 | 3.32 |  |  |  |
|  | $\alpha_{200/300}$ |  | 3.66 | 3.64 |  |  |  |
|  | $\alpha_{200/300}/\alpha_{50/100}$ |  | 1.25 | 1.26 |  |  |  |
| Difference in average thermal expansion coefficient from silicon substrate (ppm/° C.) | $\Delta\alpha_{50/100}$ |  | −0.02 | −0.06 |  |  |  |
|  | $\Delta\alpha_{100/200}$ |  | −0.02 | −0.05 |  |  |  |
|  | $\Delta\alpha_{200/300}$ |  | −0.03 | −0.05 |  |  |  |

TABLE 1-continued

|  |  |  |  |  |  |
|---|---|---|---|---|---|
| $\Delta\alpha_{200/300} - \Delta\alpha_{50/100}$ | −0.01 | 0.01 |  |  |  |
| Fictive viscosity $\log_{10}\eta$ (dPa · sec) | 14.1 | 14.1 | 14.1 | 14.1 | 14.1 |
| (1) | 2.95 | 2.90 | 2.95 | 2.94 | 2.94 |
| (2) | 3.37 | 3.33 | 3.37 | 3.38 | 3.38 |
| (3) | 3.66 | 3.64 | 3.71 | 3.70 | 3.70 |
| (4) | 1.25 | 1.25 | 1.26 | 1.26 | 1.26 |
| Density (g/cm³) | (2.47) | (2.47) | (.2.55) | (2.48) | (2.48) |
| Glass transition point Tg (° C.) | 737 | 760 | (806) | (767) | (763) |
| Young's modulus (GPa) | 80.6 | 84.1 | (85.4) | (87.4) | (86.6) |
| $T_2$ (° C.) | (1628) | (1653) | (1745) | (1671) | (1663) |
| $T_4$ (° C.) | (1262) | (1284) | (1366) | (1296) | (1292 |
| Devitrification temperature (° C.) |  |  |  |  |  |
| Devitrification viscosity $\log_{10}\eta_{TL}$ (dPa · sec) |  |  |  |  |  |
| HF weight loss value ((mg/cm²)/min) | 0.13 | 0.11 | (0.09) | (0.10) | (0.11) |
| Photoelastic constant (nm/(MPa · cm)) | (31.2) | (30.1) | (27.4) | (28.3) | (28.6) |

TABLE 2

|  |  | Example 14 | Example 15 | Example 16 | Example 17 | Example 18 | Example 19 | Example 20 |
|---|---|---|---|---|---|---|---|---|
| Composition (mol %) | SiO₂ | 68.0 | 67.1 | 66.3 | 65.4 | 68.1 | 68.4 | 67.5 |
|  | Al₂O₃ | 11.6 | 12.2 | 12.9 | 13.5 | 11.8 | 12.5 | 12.0 |
|  | B₂O₃ | 3.1 | 3.8 | 4.6 | 5.4 | 7.5 | 8.0 | 7.5 |
|  | MgO | 11.0 | 10.0 | 9.0 | 8.0 | 3.0 | 1.5 | 5.2 |
|  | CaO | 6.3 | 6.8 | 7.2 | 7.7 | 9.1 | 5.0 | 5.0 |
|  | SrO | 0.0 | 0.0 | 0.0 | 0.0 | 0.5 | 4.3 | 1.0 |
|  | BaO | 0.0 | 0.0 | 0.0 | 0.0 | 0.0 | 0.3 | 1.8 |
|  | ZnO | 0.0 | 0.0 | 0.0 | 0.0 | 0.0 | 0.0 | 0.0 |
|  | CaO + SrO + BaO | 6.3 | 6.8 | 7.2 | 7.7 | 9.6 | 9.6 | 7.8 |
| Cooling rate (° C./min) |  | 1 | 1 | 1 | 1 | 1 | 1 | 1 |
| Average thermal expansion coefficient (ppm/° C.) | $\alpha_{50/100}$ |  |  |  |  |  |  |  |
|  | $\alpha_{100/200}$ |  |  |  |  |  |  |  |
|  | $\alpha_{200/300}$ |  |  |  |  |  |  |  |
| $\alpha_{200/300}/\alpha_{50/100}$ |  |  |  |  |  |  |  |  |
| Difference in average thermal expansion coefficient from silicon substrate (ppm/° C.) | $\Delta\alpha_{50/100}$ |  |  |  |  |  |  |  |
|  | $\Delta\alpha_{100/200}$ |  |  |  |  |  |  |  |
|  | $\Delta\alpha_{200/300}$ |  |  |  |  |  |  |  |
| $\Delta\alpha_{200/300} - \Delta\alpha_{50/100}$ |  |  |  |  |  |  |  |  |
| Fictive viscosity $\log_{10}\eta$ (dPa · sec) |  | 14.1 | 14.1 | 14.1 | 14.1 | 14.1 | 14.1 | 14.1 |
| (1) |  | 2.94 | 2.94 | 2.94 | 2.93 | 3.01 | 3.02 | 2.99 |
| (2) |  | 3.38 | 3.38 | 3.38 | 3.38 | 3.38 | 3.37 | 3.38 |
| (3) |  | 3.71 | 3.71 | 3.71 | 3.71 | 3.62 | 3.62 | 3.63 |
| (4) |  | 1.26 | 1.26 | 1.26 | 1.26 | 1.20 | 1.21 | 1.22 |
| Density (g/cm³) |  | (2.47) | (2.47) | (2.47) | (2.47) | (2.42) | (2.47) | (2.48) |
| Glass transition point Tg (° C.) |  | (759) | (756) | (753) | (750) | (728) | (728) | (728) |
| Young's modulus (GPa) |  | (85.9) | (85.2) | (84.5) | (83.7) | (77.0) | (73.7) | (76.3) |
| $T_2$ (° C.) |  | (1655) | (1648) | (1641) | (1633) | (1690) | (1709) | (1687) |
| $T_4$ (° C.) |  | (1287) | (1282) | (1278) | (1274) | (1298) | (1317) | (1298) |
| Devitrification temperature (° C.) |  |  |  |  |  |  |  |  |
| Devitrification viscosity $\log_{10}\eta_{TL}$ (dPa · sec) |  |  |  |  |  |  |  |  |
| HF weight loss value ((mg/cm²)/min) |  | (0.12) | (0.13) | (0.14) | (0.15) | (0.12) | (0.11) | (0.13) |

TABLE 2-continued

| | | | | | | | |
|---|---|---|---|---|---|---|---|
| Photoelastic constant (nm/(MPa · cm)) | (28.9) | (29.1) | (29.4) | (29.7) | (32.1) | (32.1) | (31.1) |

| | | Example 21 | Example 22 | Example 23 | Example 24 | Example 25 | Example 26 |
|---|---|---|---|---|---|---|---|
| Composition (mol %) | $SiO_2$ | 75.0 | 56.0 | 73.9 | 75.0 | 58.2 | 75.0 |
| | $Al_2O_3$ | 11.8 | 15.0 | 16.0 | 6.0 | 12.0 | 6.3 |
| | $B_2O_3$ | 0.0 | 13.0 | 0.0 | 0.7 | 15.0 | 0.0 |
| | MgO | 6.2 | 10.0 | 0.0 | 15.0 | 9.8 | 15.0 |
| | CaO | 0.0 | 6.0 | 0.0 | 0.1 | 3.0 | 0.3 |
| | SrO | 7.1 | 0.0 | 9.8 | 3.1 | 2.0 | 3.3 |
| | BaO | 0.0 | 0.0 | 0.3 | 0.0 | 0.0 | 0.2 |
| | ZnO | 0.0 | 0.0 | 0.0 | 0.0 | 0.0 | 0.0 |
| | CaO + SrO + BaO | 7.1 | 6.0 | 10.1 | 3.3 | 5.0 | 3.7 |
| Cooling rate (° C./min) | | 1 | 1 | 1 | 1 | 1 | 1 |
| Average thermal expansion coefficient (ppm/° C.) | $\alpha_{50/100}$ | | | | | | |
| | $\alpha_{100/200}$ | | | | | | |
| | $\alpha_{200/300}$ | | | | | | |
| $\alpha_{200/300}/\alpha_{50/100}$ | | | | | | | |
| Difference in average thermal expansion coefficient from silicon substrate (ppm/° C.) | $\Delta\alpha_{50/100}$ | | | | | | |
| | $\Delta\alpha_{100/200}$ | | | | | | |
| | $\Delta\alpha_{200/300}$ | | | | | | |
| $\Delta\alpha_{200/300} - \Delta\alpha_{50/100}$ | | | | | | | |
| Fictive viscosity $\log_{10}\eta$ (dPa · sec) | | 14.1 | 14.1 | 14.1 | 14.1 | 14.1 | 14.1 |
| (1) | | 2.88 | 2.92 | 2.86 | 2.99 | 2.97 | 3.04 |
| (2) | | 3.27 | 3.41 | 3.27 | 3.37 | 3.40 | 3.43 |
| (3) | | 3.59 | 3.73 | 3.63 | 3.64 | 3.65 | 3.71 |
| (4) | | 1.25 | 1.27 | 1.27 | 1.22 | 1.23 | 1.22 |
| Density (g/cm³) | | (2.54) | (2.45) | (2.60) | (2.48) | (2.43) | (2.50) |
| Glass transition point Tg (° C.) | | (796) | (680) | (822) | (751) | (647) | (759) |
| Young's modulus (GPa) | | (81.9) | (78.6) | (80.7) | (83.2) | (72.4) | (84.1) |
| $T_2$ (° C.) | | (1778) | (1502) | (1797) | (1732) | (1534) | (1733) |
| $T_4$ (° C.) | | (1386) | (1170) | (1420) | (1325) | (1175) | (1329) |
| Devitrification temperature (° C.) | | | | | | | |
| Devitrification viscosity $\log_{10}\eta_{TL}$ (dPa · sec) | | | | | | | |
| HF weight loss value ((mg/cm²)/min) | | (0.04) | (0.26) | (0.06) | (0.02) | (0.22) | (0.03) |
| Photoelastic constant (nm/(MPa · cm)) | | (28.5) | (31.7) | (27.9) | (29.1) | (33.6) | (28.6) |

TABLE 3

| | | Example 27 | Example 28 | Example 29 | Example 30 | Example 31 | Example 32 | Example 33 |
|---|---|---|---|---|---|---|---|---|
| Composition (mol %) | $SiO_2$ | 60.4 | 64.5 | 71.6 | 65.8 | 74.2 | 75.0 | 74.4 |
| | $Al_2O_3$ | 12.4 | 16.0 | 15.2 | 16.0 | 14.8 | 14.7 | 16.0 |
| | $B_2O_3$ | 8.4 | 9.2 | 0.0 | 9.2 | 0.0 | 1.0 | 0.0 |
| | MgO | 15.0 | 0.0 | 0.0 | 0.0 | 0.0 | 0.4 | 0.0 |
| | CaO | 2.4 | 4.6 | 13.2 | 0.0 | 0.0 | 0.7 | 0.0 |
| | SrO | 1.3 | 2.5 | 0.0 | 2.5 | 11.0 | 0.0 | 0.0 |
| | BaO | 0.1 | 3.2 | 0.0 | 6.5 | 0.0 | 8.2 | 9.6 |

TABLE 3-continued

|  |  |  |  |  |  |  |  |  |
|---|---|---|---|---|---|---|---|---|
|  | ZnO | 0.0 | 0.0 | 0.0 | 0.0 | 0.0 | 0.0 | 0.0 |
|  | CaO + SrO + BaO | 3.8 | 10.3 | 13.2 | 9.0 | 11.0 | 8.9 | 9.6 |
| Cooling rate (° C./min) |  | 1 | 1 | 1 | 1 | 1 | 1 | 1 |
| Average thermal expansion coefficient (ppm/° C.) | $\alpha_{50/100}$ |  |  |  |  |  |  |  |
|  | $\alpha_{100/200}$ |  |  |  |  |  |  |  |
|  | $\alpha_{200/300}$ |  |  |  |  |  |  |  |
|  | $\alpha_{200/300}/\alpha_{50/100}$ |  |  |  |  |  |  |  |
| Difference in average thermal expansion coefficient from silicon substrate (ppm/° C.) | $\Delta\alpha_{50/100}$ |  |  |  |  |  |  |  |
|  | $\Delta\alpha_{100/200}$ |  |  |  |  |  |  |  |
|  | $\Delta\alpha_{200/300}$ |  |  |  |  |  |  |  |
|  | $\Delta\alpha_{200/300} - \Delta\alpha_{50/100}$ |  |  |  |  |  |  |  |
| Fictive viscosity $\log_{10}\eta$ (dPa · sec) |  | 14.1 | 14.1 | 14.1 | 14.1 | 14.1 | 14.1 | 14.1 |
|  | (1) | 2.96 | 3.04 | 3.04 | 3.04 | 3.04 | 2.96 | 3.04 |
|  | (2) | 3.45 | 3.45 | 3.44 | 3.45 | 3.44 | 3.34 | 3.45 |
|  | (3) | 3.79 | 3.73 | 3.79 | 3.69 | 3.79 | 3.59 | 3.73 |
|  | (4) | 1.28 | 1.23 | 1.24 | 1.22 | 1.25 | 1.23 | 1.24 |
| Density (g/cm$^3$) |  | (2.49) | (2.55) | (2.49) | (2.62) | (2.61) | (2.66) | (2.72) |
| Glass transition point Tg (° C.) |  | (705) | (736) | (819) | (739) | (814) | (815) | (831) |
| Young's modulus (GPa) |  | (82.7) | (73.4) | (86.6) | (70.0) | (79.7) | (76.6) | (77.5) |
| $T_2$ (° C.) |  | (1540) | (1682) | (1748) | (1725) | (1796) | (1854) | (1857) |
| $T_4$ (° C.) |  | (1199) | (1310) | (1373) | (1339) | (1417) | (1442) | (1453) |
| Devitrification temperature (° C.) |  |  |  |  |  |  |  |  |
| Devitrification viscosity $\log_{10}\eta_{TL}$ (dPa · sec) |  |  |  |  |  |  |  |  |
| HF weight loss value ((mg/cm$^2$)/min) |  | (0.21) | (0.18) | (0.10) | (0.17) | (0.07) | (0.07) | (0.09) |
| Photoelastic constant (nm/(MPa · cm)) |  | (29.7) | (30.7) | (28.3) | (29.9) | (28.1) | (26.9) | (25.5) |

|  |  | Example 34 | Example 35 | Example 36 | Example 37 | Example 38 | Example 39 |
|---|---|---|---|---|---|---|---|
| Composition (mol %) | SiO$_2$ | 73.4 | 66.3 | 66.9 | 66.3 | 70.6 | 71.4 |
|  | Al$_2$O$_3$ | 13.7 | 14.2 | 14.2 | 14.2 | 12.0 | 12.0 |
|  | B$_2$O$_3$ | 1.2 | 6.0 | 5.2 | 5.5 | 1.3 | 1.6 |
|  | MgO | 2.2 | 4.9 | 5.0 | 5.0 | 8.0 | 6.0 |
|  | CaO | 4.3 | 5.0 | 6.3 | 8.0 | 8.0 | 9.0 |
|  | SrO | 5.2 | 3.5 | 2.0 | 1.0 | 0.0 | 0.0 |
|  | BaO | 0.0 | 0.0 | 0.4 | 0.0 | 0.0 | 0.0 |
|  | ZnO | 0.0 |  |  |  |  |  |
|  | CaO + SrO + BaO | 9.5 | 8.5 | 8.8 | 9.1 | 8.0 | 9.0 |
| Cooling rate (° C./min) |  | 1 | 1 | 1 | 1 | 1 | 1 |
| Average thermal expansion coefficient (ppm/° C.) | $\alpha_{50/100}$ |  |  |  |  |  |  |
|  | $\alpha_{100/200}$ |  |  |  |  |  |  |
|  | $\alpha_{200/300}$ |  |  |  |  |  |  |
|  | $\alpha_{200/300}/\alpha_{50/100}$ |  |  |  |  |  |  |
| Difference in average thermal expansion coefficient from silicon substrate (ppm/° C.) | $\Delta\alpha_{50/100}$ |  |  |  |  |  |  |
|  | $\Delta\alpha_{100/200}$ |  |  |  |  |  |  |
|  | $\Delta\alpha_{200/300}$ |  |  |  |  |  |  |
|  | $\Delta\alpha_{200/300} - \Delta\alpha_{50/100}$ |  |  |  |  |  |  |
| Fictive viscosity $\log_{10}\eta$ (dPa · sec) |  | 14.1 | 14.1 | 14.1 | 14.1 | 14.1 | 14.1 |
|  | (1) | 2.88 | 2.94 | 2.94 | 2.94 | 2.95 | 2.97 |
|  | (2) | 3.27 | 3.37 | 3.37 | 3.37 | 3.37 | 3.37 |
|  | (3) | 3.59 | 3.69 | 3.69 | 3.69 | 3.69 | 3.68 |
|  | (4) | 1.25 | 1.25 | 1.25 | 1.25 | 1.25 | 1.24 |

TABLE 3-continued

|  |  |  |  |  |  |  |
|---|---|---|---|---|---|---|
| Density (g/cm³) | (2.52) | (2.50) | (2.49) | (2.47) | (2.47) | (2.46) |
| Glass transition point Tg (° C.) | (798) | (750) | (759) | (756) | (782) | (782) |
| Young's modulus (GPa) | (81.5) | (80.0) | (81.3) | (82.0) | (86.4) | (85.0) |
| $T_2$ (° C.) | (1772) | (1664) | (1672) | (1660) | (1702) | (1720) |
| $T_4$ (° C.) | (1385) | (1299) | (1305) | (1296) | (1325) | (1336) |
| Devitrification temperature (° C.) |  |  |  |  |  |  |
| Devitrification viscosity $\log_{10}\eta_{TL}$ (dPa · sec) |  |  |  |  |  |  |
| HF weight loss value ((mg/cm²)/min) | (0.06) | (0.14) | (0.14) | (0.15) | (0.09) | (0.09) |
| Photoelastic constant (nm/(MPa · cm)) | (29.1) | (30.1) | (29.7) | (30.0) | (28.6) | (29.1) |

TABLE 4

|  |  | Example 40 | Example 41 | Example 42 | Example 43 | Example 44 | Example 45 | Example 46 |
|---|---|---|---|---|---|---|---|---|
| Composition (mol %) | $SiO_2$ | 67.1 | 70.0 | 69.0 | 68.0 | 69.8 | 68.5 | 67.6 |
|  | $Al_2O_3$ | 12.5 | 11.1 | 12.1 | 13.3 | 13.1 | 14.3 | 15.0 |
|  | $B_2O_3$ | 5.5 | 1.9 | 2.0 | 1.5 | 2.4 | 3.7 | 3.7 |
|  | MgO | 8.5 | 10.3 | 9.8 | 10.1 | 8.3 | 5.7 | 6.8 |
|  | CaO | 2.0 | 6.5 | 7.0 | 7.1 | 2.4 | 2.0 | 0.5 |
|  | SrO | 4.4 | 0.2 | 0.0 | 0.0 | 0.0 | 1.8 | 0.4 |
|  | BaO | 0.0 | 0.0 | 0.0 | 0.0 | 4.0 | 4.0 | 6.0 |
|  | ZnO |  |  |  |  |  |  |  |
|  | CaO + SrO + BaO | 6.4 | 6.7 | 7.0 | 7.1 | 6.4 | 7.8 | 6.9 |
| Cooling rate (° C./min) |  | 1 | 1 | 1 | 1 | 1 | 1 | 1 |
| Average thermal expansion coefficient (ppm/° C.) | $\alpha_{50/100}$ |  |  |  |  |  |  |  |
|  | $\alpha_{100/200}$ |  |  |  |  |  |  |  |
|  | $\alpha_{200/300}$ |  |  |  |  |  |  |  |
|  | $\alpha_{200/300}/\alpha_{50/100}$ |  |  |  |  |  |  |  |
| Difference in average thermal expansion coefficient from silicon substrate (ppm/° C.) | $\Delta\alpha_{50/100}$ |  |  |  |  |  |  |  |
|  | $\Delta\alpha_{100/200}$ |  |  |  |  |  |  |  |
|  | $\Delta\alpha_{200/300}$ |  |  |  |  |  |  |  |
|  | $\Delta\alpha_{200/300} - \Delta\alpha_{50/100}$ |  |  |  |  |  |  |  |
| Fictive viscosity $\log_{10}\eta$ (dPa · sec) |  | 14.1 | 14.1 | 14.1 | 14.1 | 14.1 | 14.1 | 14.1 |
| (1) |  | 2.94 | 2.94 | 2.93 | 2.91 | 2.94 | 3.01 | 3.00 |
| (2) |  | 3.37 | 3.37 | 3.37 | 3.37 | 3.38 | 3.45 | 3.46 |
| (3) |  | 3.69 | 3.69 | 3.71 | 3.74 | 3.69 | 3.76 | 3.77 |
| (4) |  | 1.26 | 1.25 | 1.26 | 1.28 | 1.26 | 1.25 | 1.26 |
| Density (g/cm³) |  | (2.51) | (2.47) | (2.48) | (2.50) | (2.58) | (2.60) | (2.64) |
| Glass transition point Tg (° C.) |  | (743) | (770) | (774) | (783) | (780) | (775) | (778) |
| Young's modulus (GPa) |  | (80.3) | (86.1) | (86.8) | (88.5) | (82.5) | (80.0) | (80.0) |
| $T_2$ (° C.) |  | (1660) | (1684) | (1673) | (1659) | (1720) | (1715) | (1712) |
| $T_4$ (° C.) |  | (1292) | (1308) | (1304) | (1301) | (1340) | (1340) | (1340) |
| Devitrification temperature (° C.) |  |  |  |  |  |  |  |  |
| Devitrification viscosity $\log_{10}\eta_{TL}$ (dPa · sec) |  |  |  |  |  |  |  |  |
| HF weight loss value ((mg/cm²)/min) |  | (0.13) | (0.10) | (0.11) | (0.13) | (0.11) | (0.14) | (0.15) |
| Photoelastic constant (nm/(MPa · cm)) |  | (29.8) | (28.7) | (28.5) | (27.8) | (27.5) | (27.9) | (27.0) |

TABLE 4-continued

|  |  | Example 47 | Example 48 | Example 49 | Example 50 | Example 51 | Example 52 |
|---|---|---|---|---|---|---|---|
| Composition (mol %) | $SiO_2$ | 60.0 | 58.0 | 71.0 | 69.0 | 70.0 | 70.0 |
|  | $Al_2O_3$ | 13.0 | 13.4 | 8.0 | 9.0 | 12.0 | 12.0 |
|  | $B_2O_3$ | 8.0 | 10.0 | 4.6 | 6.4 | 2.4 | 2.4 |
|  | MgO | 15.0 | 14.4 | 12.0 | 11.1 | 8.0 | 8.0 |
|  | CaO | 3.6 | 4.2 | 1.4 | 1.0 | 5.6 | 5.6 |
|  | SrO | 0.4 | 0.0 | 2.0 | 1.5 | 2.0 | 2.0 |
|  | BaO | 0.0 | 0.0 | 1.0 | 2.0 | 0.0 | 0.0 |
|  | ZnO |  |  |  |  |  |  |
|  | CaO + SrO + BaO | 4.0 | 4.2 | 4.4 | 4.5 | 7.6 | 7.6 |
| Cooling rate (° C./min) |  | 1 | 1 | 1 | 1 | 40 | 100 |
| Average thermal expansion coefficient (ppm/° C.) | $\alpha_{50/100}$ |  |  |  |  | 3.00 | 2.99 |
|  | $\alpha_{100/200}$ |  |  |  |  | 3.46 | 3.42 |
|  | $\alpha_{200/300}$ |  |  |  |  | 3.76 | 3.75 |
|  | $\alpha_{200/300}/\alpha_{50/100}$ |  |  |  |  | 1.25 | 1.25 |
| Difference in average thermal expansion coefficient from silicon substrate (ppm/° C.) | $\Delta\alpha_{50/100}$ |  |  |  |  | 0.06 | 0.05 |
|  | $\Delta\alpha_{100/200}$ |  |  |  |  | 0.09 | 0.05 |
|  | $\Delta\alpha_{200/300}$ |  |  |  |  | 0.07 | 0.06 |
|  | $\Delta\alpha_{200/300} - \Delta\alpha_{50/100}$ |  |  |  |  | 0.02 | 0.02 |
| Fictive viscosity $\log_{10}\eta$ (dPa·sec) |  | 14.1 | 14.1 | 14.1 | 14.1 | 12.5 | 12.1 |
| (1) |  | 2.92 | 2.93 | 3.00 | 3.01 | 3.02 | 3.04 |
| (2) |  | 3.43 | 3.44 | 3.38 | 3.40 | 3.45 | 3.46 |
| (3) |  | 3.78 | 3.78 | 3.63 | 3.63 | 3.76 | 3.77 |
| (4) |  | 1.29 | 1.29 | 1.22 | 1.22 | 1.24 | 1.24 |
| Density (g/cm³) |  | (2.49) | (2.47) | (2.48) | (2.49) | (2.49) | (2.49) |
| Glass transition point Tg (° C.) |  | (712) | (695) | (728) | (717) | (771) | (771) |
| Young's modulus (GPa) |  | (84.3) | (82.6) | (79.2) | (77.2) | (84.2) | (84.2) |
| $T_2$ (° C.) |  | (1533) | (1509) | (1699) | (1683) | (1696) | (1696) |
| $T_4$ (° C.) |  | (1197) | (1176) | (1298) | (1287) | (1320) | (1320) |
| Devitrification temperature (° C.) |  |  |  |  |  |  |  |
| Devitrification viscosity $\log_{10}\eta_{TL}$ (dPa·sec) |  |  |  |  |  |  |  |
| HF weight loss value ((mg/cm²)/min) |  | (0.21) | (0.24) | (0.08) | (0.10) |  |  |
| Photoelastic constant (nm/(MPa·cm)) |  | (29.4) | (30.2) | (30.3) | (30.5) |  |  |

TABLE 5

|  |  | Example 53 | Example 54 | Example 55 | Example 56 | Example 57 | Example 58 | Example 59 |
|---|---|---|---|---|---|---|---|---|
| Composition (mol %) | $SiO_2$ | 65.9 | 65.9 | 68.0 | 68.0 | 68.0 | 68.0 | 68.0 |
|  | $Al_2O_3$ | 12.9 | 12.9 | 13.0 | 13.0 | 13.0 | 13.0 | 13.0 |
|  | $B_2O_3$ | 6.2 | 6.2 | 4.7 | 4.7 | 5.8 | 5.8 | 6.4 |
|  | MgO | 8.0 | 8.0 | 6.0 | 6.0 | 4.2 | 4.2 | 3.6 |
|  | CaO | 4.0 | 4.0 | 5.3 | 5.3 | 5.0 | 5.0 | 5.0 |
|  | SrO | 3.0 | 3.0 | 3.0 | 3.0 | 4.0 | 4.0 | 4.0 |
|  | BaO | 0.0 | 0.0 | 0.0 | 0.0 | 0.0 | 0.0 | 0.0 |
|  | ZnO |  |  |  |  |  |  |  |
|  | CaO + SrO + BaO | 7.0 | 7.0 | 8.3 | 8.3 | 9.0 | 9.0 | 9.0 |
| Cooling rate (° C./min) |  | 40 | 100 | 40 | 100 | 40 | 100 | 40 |
| Average thermal | $\alpha_{50/100}$ | 3.00 | 3.06 | 3.03 | 3.02 | 3.04 | 3.09 | 3.05 |
|  | $\alpha_{100/200}$ | 3.43 | 3.46 | 3.46 | 3.44 | 3.45 | 3.50 | 3.49 |

TABLE 5-continued

| | | | | | | | | |
|---|---|---|---|---|---|---|---|---|
| expansion coefficient (ppm/° C.) | $\alpha_{200/300}$ | 3.77 | 3.74 | 3.75 | 3.76 | 3.70 | 3.77 | 3.79 |
| | $\alpha_{200/300}/\alpha_{50/100}$ | 1.26 | 1.22 | 1.24 | 1.24 | 1.22 | 1.22 | 1.24 |
| Difference in average thermal expansion coefficient from silicon substrate (ppm/° C.) | $\Delta\alpha_{50/100}$ | 0.06 | 0.11 | 0.09 | 0.08 | 0.10 | 0.15 | 0.11 |
| | $\Delta\alpha_{100/200}$ | 0.06 | 0.10 | 0.10 | 0.07 | 0.09 | 0.14 | 0.12 |
| | $\Delta\alpha_{200/300}$ | 0.08 | 0.05 | 0.06 | 0.07 | 0.01 | 0.08 | 0.10 |
| | $\Delta\alpha_{200/300} - \Delta\alpha_{50/100}$ | 0.02 | −0.06 | −0.03 | −0.01 | −0.09 | −0.07 | −0.01 |
| Fictive viscosity $\log_{10}\eta$ (dPa · sec) | | 12.5 | 12.1 | 12.5 | 12.1 | 12.5 | 12.1 | 12.5 |
| | (1) | 3.01 | 3.03 | 3.03 | 3.05 | 3.07 | 3.08 | 3.05 |
| | (2) | 3.45 | 3.47 | 3.46 | 3.47 | 3.47 | 3.49 | 3.45 |
| | (3) | 3.76 | 3.77 | 3.76 | 3.77 | 3.76 | 3.77 | 3.72 |
| | (4) | 1.25 | 1.25 | 1.24 | 1.24 | 1.23 | 1.22 | 1.22 |
| Density (g/cm³) | | (2.49) | (2.49) | (2.49) | (2.49) | (2.49) | (2.49) | (2.48) |
| Glass transition point Tg (° C.) | | (738) | (738) | (756) | (756) | (747) | (747) | (743) |
| Young's modulus (GPa) | | (80.6) | (80.6) | (81.1) | (81.1) | (78.4) | (78.4) | (77.5) |
| $T_2$ (° C.) | | (1643) | (1643) | (1680) | (1680) | (1689) | (1689) | (1691) |
| $T_4$ (° C.) | | (1279) | (1279) | (1308) | (1308) | (1312) | (1312) | (1312) |
| Devitrification temperature (° C.) | | | | | | | | |
| Devitrification viscosity $\log_{10}\eta_{TL}$ (dPa · sec) | | | | | | | | |
| HF weight loss value ((mg/cm²)/min) | | | | | | | | |
| Photoelastic constant (nm/(MPa · cm)) | | | | | | | | |

| | | Example 60 | Example 61 | Example 62 | Example 63 | Example 64 | Example 65 |
|---|---|---|---|---|---|---|---|
| Composition (mol %) | SiO₂ | 68.0 | 66.1 | 68.6 | 71.9 | 55.4 | 67.2 |
| | Al₂O₃ | 13.0 | 11.3 | 11.4 | 12.6 | 13.6 | 11.3 |
| | B₂O₃ | 6.4 | 7.8 | 7.9 | 1.7 | 6.1 | 10.0 |
| | MgO | 3.6 | 5.1 | 2.5 | 4.0 | 23.0 | 4.6 |
| | CaO | 5.0 | 4.5 | 9.1 | 5.0 | 0.0 | 5.5 |
| | SrO | 4.0 | 5.2 | 0.5 | 1.2 | 0.0 | 0.0 |
| | BaO | 0.0 | 0.0 | 0.0 | 3.6 | 0.0 | 1.4 |
| | ZnO | | 0.0 | 0.0 | 0.0 | 1.9 | 0.0 |
| | CaO + SrO + BaO | 9.0 | 9.7 | 9.6 | 9.8 | 0.0 | 6.9 |
| Cooling rate (° C./min) | | 100 | 40 | 700 | 300 | 1 | 1 |
| Average thermal expansion coefficient (ppm/° C.) | $\alpha_{50/100}$ | 3.07 | 3.38 | 3.12 | 3.23 | 3.11 | 2.79 |
| | $\alpha_{100/200}$ | 3.47 | 3.75 | 3.45 | 3.60 | 3.64 | 3.14 |
| | $\alpha_{200/300}$ | 3.75 | 4.02 | 3.68 | 3.87 | 4.09 | 3.38 |
| | $\alpha_{200/300}/\alpha_{50/100}$ | 1.22 | 1.19 | 1.18 | 1.20 | 1.31 | 1.21 |
| Difference in average thermal expansion coefficient from silicon substrate (ppm/° C.) | $\Delta\alpha_{50/100}$ | 0.12 | 0.44 | 0.17 | 0.29 | 0.17 | −0.15 |
| | $\Delta\alpha_{100/200}$ | 0.10 | 0.38 | 0.08 | 0.24 | 0.28 | −0.23 |
| | $\Delta\alpha_{200/300}$ | 0.06 | 0.33 | −0.01 | 0.18 | 0.40 | −0.31 |
| | $\Delta\alpha_{200/300} - \Delta\alpha_{50/100}$ | −0.06 | −0.11 | −0.19 | −0.11 | 0.23 | −0.16 |
| Fictive viscosity $\log_{10}\eta$ (dPa · sec) | | 12.1 | 12.5 | 11.2 | 11.6 | 14.1 | 14.1 |
| | (1) | 3.06 | 3.36 | 3.10 | 3.25 | 2.75 | 2.86 |
| | (2) | 3.46 | 3.75 | 3.46 | 3.66 | 3.34 | 3.22 |
| | (3) | 3.73 | 4.01 | 3.67 | 3.92 | 3.78 | 3.43 |
| | (4) | 1.22 | 1.19 | 1.18 | 1.21 | 1.33 | 1.20 |
| Density (g/cm³) | | (2.48) | 2.51 | 2.41 | 2.58 | 2.54 | 2.42 |
| Glass transition point Tg (° C.) | | (743) | 710 | (723) | (787) | (720) | (703) |
| Young's modulus (GPa) | | (77.5) | 76 | (75.7) | (80.6) | (89.9) | (73.3) |
| $T_2$ (° C.) | | (1691) | 1645 | (1700) | (1761) | (1444) | (1684) |

TABLE 5-continued

|  |  |  |  |  |  |  |
|---|---|---|---|---|---|---|
| $T_4$ (° C.) | (1312) | 1275 | (1302) | (1369) | (1143) | (1285) |
| Devitrification temperature (° C.) |  | 1270 |  |  |  |  |
| Devitrification viscosity $\log_{10}\eta_{TL}$ (dPa · sec) |  |  |  |  |  |  |
| HF weight loss value ((mg/cm²)/min) |  | (0.16) | (0.11) | (0.10) | (0.25) | (0.11) |
| Photoelastic constant (nm/(MPa · cm)) |  | 30.6 | 33.8 | (28.0) | (20.6) | (32.9) |

TABLE 6

|  |  | Example 66 | Example 67 | Example 68 | Example 69 | Example 70 | Example 71 | Example 72 |
|---|---|---|---|---|---|---|---|---|
| Composition (mol %) | SiO₂ | 64.3 | 66.0 | 63.6 | 60.0 | 64.2 | 65.9 | 65.9 |
|  | Al₂O₃ | 13.0 | 12.1 | 13.3 | 13.5 | 12.8 | 14.0 | 14.0 |
|  | B₂O₃ | 7.0 | 9.7 | 10.9 | 14.5 | 10.7 | 7.3 | 6.8 |
|  | MgO | 9.0 | 5.5 | 5.5 | 5.7 | 6.5 | 4.0 | 5.0 |
|  | CaO | 5.7 | 1.0 | 1.0 | 1.0 | 1.0 | 7.0 | 6.0 |
|  | SrO | 1.0 | 5.8 | 5.8 | 5.3 | 1.4 | 1.8 | 2.3 |
|  | BaO | 0.0 | 0.0 | 0.0 | 0.0 | 3.4 | 0.0 | 0.0 |
|  | ZnO | 0.0 | 0.0 | 0.0 | 0.0 | 0.0 | 0.0 | 0.0 |
|  | CaO + SrO + BaO | 6.7 | 6.8 | 6.8 | 6.3 | 5.8 | 8.8 | 8.3 |
| Cooling rate (° C./min) |  | 40 | 40 | 40 | 40 | 40 | 1 | 1 |
| Average thermal expansion coefficient (ppm/° C.) | $\alpha_{50/100}$ | 2.97 | 2.99 | 2.98 | 3.06 | 2.97 | 2.89 | 2.91 |
|  | $\alpha_{100/200}$ | 3.39 | 3.37 | 3.35 | 3.43 | 3.33 | 3.31 | 3.32 |
|  | $\alpha_{200/300}$ | 3.73 | 3.63 | 3.60 | 3.69 | 3.56 | 3.61 | 3.64 |
|  | $\alpha_{200/300}/\alpha_{50/100}$ | 1.26 | 1.21 | 1.21 | 1.21 | 1.20 | 1.25 | 1.25 |
| Difference in average thermal expansion coefficient from silicon substrate (ppm/° C.) | $\Delta\alpha_{50/100}$ | 0.02 | 0.05 | 0.03 | 0.11 | 0.03 | −0.05 | −0.03 |
|  | $\Delta\alpha_{100/200}$ | 0.03 | 0.00 | −0.02 | 0.07 | −0.04 | −0.05 | −0.04 |
|  | $\Delta\alpha_{200/300}$ | 0.04 | −0.06 | −0.09 | 0.00 | −0.13 | −0.08 | −0.05 |
|  | $\Delta\alpha_{200/300} - \Delta\alpha_{50/100}$ | 0.02 | −0.11 | −0.12 | −0.11 | −0.16 | −0.03 | −0.02 |
| Fictive viscosity $\log_{10}\eta$ (dPa · sec) |  | 12.5 | 12.5 | 12.5 | 12.5 | 12.5 | 14.1 | 14.1 |
| (1) |  | 2.98 | 3.00 | 2.98 | 2.98 | 3.00 | 2.92 | 2.91 |
| (2) |  | 3.43 | 3.40 | 3.40 | 3.40 | 3.41 | 3.32 | 3.33 |
| (3) |  | 3.74 | 3.64 | 3.66 | 3.64 | 3.64 | 3.62 | 3.63 |
| (4) |  | 1.25 | 1.22 | 1.23 | 1.23 | 1.22 | 1.24 | 1.25 |
| Density (g/cm³) |  | (2.47) | 2.47 | 2.48 | (2.46) | (2.52) | ((2.46) | 2.47 |
| Glass transition point Tg (° C.) |  | (730) | (704) | (698) | (664) | (700) | 750 | 755 |
| Young's modulus (GPa) |  | 83.4 | 75.7 | 76.4 | 73.7 | 75.6 | (78.8) | (79.6) |
| $T_2$ (° C.) |  | (1616) | (1660) | (1629) | (1580) | (1652) | (1660) | (1657) |
| $T_4$ (° C.) |  | (1256) | (1279) | (1260) | (1217) | (1270) | (1290) | (1290) |
| Devitrification temperature (° C.) |  | 1350 | 1310 | 1315 | 1315 | 1315 | 1350 | 1350 |
| Devitrification viscosity $\log_{10}\eta_{TL}$ (dPa · sec) |  | 3.41 | 3.78 | 3.61 | 3.33 | 3.69 | 3.58 | 3.58 |
| HF weight loss value ((mg/cm²)/min) |  | 014 | 0.13 | 0.16 | 0.18 | 0.15 | (0.14) | (0.15) |
| Photoelastic constant (nm/(MPa · cm)) |  | (30.3) | (32.3) | (32.3) | (33.6) | (31.4) | (31.1) | (30.6) |

|  |  | Example 73 | Example 74 | Example 75 | Example 76 | Example 77 | Example 78 |
|---|---|---|---|---|---|---|---|
| Composition (mol %) | SiO₂ | 65.9 | 64.8 | 64.0 | 66.2 | 66.5 | 66.0 |
|  | Al₂O₃ | 14.0 | 15.5 | 16.0 | 16.0 | 13.5 | 13.0 |
|  | B₂O₃ | 6.6 | 7.8 | 8.6 | 6.4 | 6.6 | 7.4 |
|  | MgO | 5.6 | 4.3 | 4.2 | 4.0 | 6.8 | 7.1 |

TABLE 6-continued

|  |  |  |  |  |  |  |  |
|---|---|---|---|---|---|---|---|
|  | CaO | 5.0 | 1.6 | 1.0 | 1.0 | 1.0 | 1.0 |
|  | SrO | 2.9 | 4.0 | 2.3 | 1.4 | 5.7 | 5.5 |
|  | BaO | 0.0 | 2.0 | 3.9 | 5.0 | 0.0 | 0.0 |
|  | ZnO | 0.0 | 0.0 | 0.0 | 0.0 | 0.0 | 0.0 |
|  | CaO + SrO + BaO | 7.9 | 7.6 | 7.2 | 7.4 | 6.7 | 6.5 |
| Cooling rate (° C./min) |  | 1 | 40 | 40 | 40 | 40 | 40 |
| Average thermal expansion coefficient (ppm/° C.) | $\alpha_{50/100}$ | 2.91 | 2.93 | 2.95 | 2.91 | 2.97 | 2.96 |
|  | $\alpha_{100/200}$ | 3.31 | 3.31 | 3.32 | 3.27 | 3.39 | 3.34 |
|  | $\alpha_{200/300}$ | 3.59 | 3.60 | 3.63 | 3.56 | 3.67 | 3.66 |
|  | $\alpha_{200/300}/\alpha_{50/100}$ | 1.23 | 1.23 | 1.23 | 1.22 | 1.24 | 1.24 |
| Difference in average thermal expansion coefficient from silicon substrate (ppm/° C.) | $\Delta\alpha_{50/100}$ | -0.03 | -0.01 | 0.00 | 0.0 | 0.03 | 0.01 |
|  | $\Delta\alpha_{100/200}$ | -0.06 | -0.06 | -0.05 | -0.1 | 0.02 | -0.03 |
|  | $\Delta\alpha_{200/300}$ | -0.10 | -0.09 | -0.06 | -0.1 | -0.02 | -0.03 |
|  | $\Delta\alpha_{200/300} - \Delta\alpha_{50/100}$ | -0.07 | -0.08 | -0.06 | -0.10 | -0.05 | -0.04 |
| Fictive viscosity $\log_{10}\eta$ (dPa · sec) |  | 14.1 | 12.5 | 12.5 | 12.5 | 12.5 | 12.5 |
| (1) |  | 2.90 | 2.95 | 2.95 | 2.95 | 2.95 | 2.97 |
| (2) |  | 3.33 | 3.39 | 3.40 | 3.40 | 3.39 | 3.40 |
| (3) |  | 3.64 | 3.69 | 3.68 | 3.69 | 3.69 | 3.69 |
| (4) |  | 1.26 | 1.25 | 1.25 | 1.25 | 1.25 | 1.25 |
| Density (g/cm³) |  | 2.48 | (2.54) | (2.57) | (2.60) | (2.52) | (2.51) |
| Glass transition point Tg (° C.) |  | 754 | (741) | (738) | (761) | (739) | (728) |
| Young's modulus (GPa) |  | (79.8) | 79.3 | 78.2 | 77.5 | 78.4 | 79.3 |
| $T_2$ (° C.) |  | (1655) | (1664) | (1665) | (1702) | (1661) | (1653) |
| $T_4$ (° C.) |  | (1290) | (1300) | (1300) | (1330) | (1295) | (1285) |
| Devitrification temperature (° C.) |  | 1340 | 1380 | 1380 | 1380 | 1320 | 1310 |
| Devitrification viscosity $\log_{10}\eta_{TL}$ (dPa · sec) |  | 3.64 | 3.32 | 3.32 | 3.52 | 3.82 | 3.82 |
| HF weight loss value ((mg/cm²)/min) |  | (0.14) | 0.16 | 0.17 | 0.16 | 0.13 | 0.13 |
| Photoelastic constant (nm/(MPa · cm)) |  | (30.4) | (30.1) | (29.7) | (28.6) | (30.3) | (30.7) |

TABLE 7

|  |  | Example 79 | Example 80 | Example 81 | Example 82 | Example 83 |
|---|---|---|---|---|---|---|
| Composition (mol %) | SiO₂ | 66.4 | 66.4 | 66.3 | 66.4 | 66.3 |
|  | Al₂O₃ | 12.8 | 13.0 | 12.5 | 12.7 | 12.5 |
|  | B₂O₃ | 5.5 | 5.2 | 5.8 | 5.3 | 5.6 |
|  | MgO | 8.0 | 7.2 | 8.0 | 8.0 | 7.6 |
|  | CaO | 4.0 | 7.2 | 3.0 | 4.0 | 4.0 |
|  | SrO | 3.3 | 1.0 | 4.4 | 3.6 | 4.0 |
|  | BaO | 0.0 | 0.0 | 0.0 | 0.0 | 0.0 |
|  | ZnO | 0.0 | 0.0 | 0.0 | 0.0 | 0.0 |
|  | CaO + SrO + BaO | 7.3 | 8.2 | 7.3 | 7.6 | 8.0 |
| Cooling rate (° C./min) |  | 1 | 1 | 1 | 1 | 1 |
| Average thermal expansion coefficient (ppm/° C.) | $\alpha_{50/100}$ | 2.95 |  | 3.03 | 3.05 | 3.08 |
|  | $\alpha_{100/200}$ | 3.40 |  | 3.47 | 3.49 | 3.53 |
|  | $\alpha_{200/300}$ | 3.70 |  | 3.79 | 3.80 | 3.84 |
|  | $\alpha_{200/300}/\alpha_{50/100}$ | 1.25 |  | 1.25 | 1.25 | 1.25 |
| Difference in average thermal expansion coefficient from silicon substrate (ppm/° C.) | $\Delta\alpha_{50/100}$ | 0.01 |  | 0.09 | 0.10 | 0.13 |
|  | $\Delta\alpha_{100/200}$ | 0.03 |  | 0.11 | 0.12 | 0.16 |
|  | $\Delta\alpha_{200/300}$ | 0.01 |  | 0.10 | 0.11 | 0.15 |
|  | $\Delta\alpha_{200/300} - \Delta\alpha_{50/100}$ | 0.00 |  | 0.02 | 0.01 | 0.01 |
| Fictive viscosity $\log_{10}\eta$ (dPa · sec) |  | 14.1 | 14.1 | 14.1 | 14.1 | 14.1 |
| (1) |  | 2.99 | 2.99 | 3.04 | 3.04 | 3.09 |
| (2) |  | 3.42 | 3.42 | 3.47 | 3.47 | 3.52 |

TABLE 7-continued

| | | | | | |
|---|---|---|---|---|---|
| (3) | 3.74 | 3.74 | 3.79 | 3.80 | 3.84 |
| (4) | 1.25 | 1.25 | 1.25 | 1.25 | 1.24 |
| Density (g/cm$^3$) | (2.50) | (2.48) | (2.51) | (2.51) | (2.51) |
| Glass transition point Tg (° C.) | 749 | (749) | 744 | 747 | 745 |
| Young's modulus (GPa) | (81.1) | (82.5) | (80.0) | (81.2) | (80.4) |
| T$_2$ (° C.) | (1650) | (1650) | (1650) | (1650) | (1650) |
| T$_4$ (° C.) | (1285) | (1284) | (1284) | (1286) | (1285) |
| Devitrification temperature (° C.) | 1290 | | 1270 | 1310 | 1290 |
| Devitrification viscosity log$_{10}\eta_{TL}$ (dPa · sec) | 3.97 | | 4.11 | 3.82 | 3.96 |
| HF weight loss value ((mg/cm$^2$)/min) | (0.14) | (0.14) | (0.15) | (0.15) | (0.15) |
| Photoelastic constant (nm/(MPa · cm)) | (29.7) | (29.8) | (29.8) | (29.6) | (29.8) |

| | | | Example 84 | Example 85 | Example 86 | Example 87 |
|---|---|---|---|---|---|---|
| Composition (mol %) | | SiO$_2$ | 66.5 | 66.0 | 66.4 | 66.7 |
| | | Al$_2$O$_3$ | 12.1 | 13.0 | 12.5 | 12.5 |
| | | B$_2$O$_3$ | 5.7 | 5.0 | 5.2 | 4.6 |
| | | MgO | 8.2 | 6.3 | 7.3 | 8.0 |
| | | CaO | 3.3 | 8.7 | 5.4 | 7.2 |
| | | SrO | 4.3 | 1.0 | 3.3 | 1.0 |
| | | BaO | 0.0 | 0.0 | 0.0 | 0.0 |
| | | ZnO | 0.0 | 0.0 | 0.0 | 0.0 |
| | | CaO + SrO + BaO | 7.6 | 9.7 | 8.7 | 8.2 |
| Cooling rate (° C./min) | | | 1 | 1 | 1 | 1 |
| Average thermal expansion coefficient (ppm/° C.) | $\alpha_{50/100}$ | | 3.10 | 3.11 | 3.11 | 2.96 |
| | $\alpha_{100/200}$ | | 3.53 | 3.56 | 3.57 | 3.42 |
| | $\alpha_{200/300}$ | | 3.84 | 3.89 | 3.89 | 3.76 |
| $\alpha_{200/300}/\alpha_{50/100}$ | | | 1.24 | 1.25 | 1.25 | 1.27 |
| Difference in average thermal expansion coefficient from silicon substrate (ppm/° C.) | $\Delta\alpha_{50/100}$ | | 0.15 | 0.17 | 0.17 | 0.02 |
| | $\Delta\alpha_{100/200}$ | | 0.16 | 0.20 | 0.20 | 0.06 |
| | $\Delta\alpha_{200/300}$ | | 0.15 | 0.20 | 0.20 | 0.07 |
| $\Delta\alpha_{200/300} - \Delta\alpha_{50/100}$ | | | −0.01 | 0.03 | 0.03 | 0.05 |
| Fictive viscosity log$_{10}\eta$ (dPa · sec) | | | 14.1 | 14.1 | 14.1 | 14.1 |
| (1) | | | 3.10 | 3.14 | 3.14 | 3.04 |
| (2) | | | 3.52 | 3.57 | 3.57 | 3.47 |
| (3) | | | 3.83 | 3.89 | 3.89 | 3.79 |
| (4) | | | 1.24 | 1.24 | 1.24 | 1.25 |
| Density (g/cm$^3$) | | | (2.51) | 2.48 | (2.51) | 2.47 |
| Glass transition point Tg (° C.) | | | 745 | 761 | 750 | 750 |
| Young's modulus (GPa) | | | (80.0) | 84.0 | (81.2) | 84.4 |
| T$_2$ (° C.) | | | (1650) | (1646) | (1650) | (1650) |
| T$_4$ (° C.) | | | (1283) | (1283) | (1286) | (1284) |
| Devitrification temperature (° C.) | | | 1290 | 1270 | 1270 | 1295 |
| Devitrification viscosity log$_{10}\eta_{TL}$ (dPa · sec) | | | 3.95 | 4.10 | 4.12 | 3.92 |
| HF weight loss value ((mg/cm$^2$)/min) | | | (0.15) | (0.16) | (0.15) | (0.14) |
| Photoelastic constant (nm/(MPa · cm)) | | | (29.8) | (29.6) | (29.6) | (29.5) |

Examples 1 to 60 and 66 to 87 are concerned with working examples, and Examples 61 to 65 are concerned with comparative examples.

In the glass substrates of the present invention of Examples 1 to 60 and 66 to 87 which are concerned with the working examples, since the content of the alkali metal oxide is 0.1% or less, in the heat treatment step of sticking the silicone substrate and the glass substrate to each other, the alkali ion is not diffused into the silicon substrate. In addition, since the average thermal expansion coefficient $\alpha_{50/100}$ at 50° C. to 100° C. is 2.70 ppm/° C. to 3.20 ppm/° C., the average thermal expansion coefficient $\alpha_{200/300}$ at 200° C. to 300° C. is 3.45 ppm/° C. to 3.95 ppm/° C., and the value $\alpha_{200/300}/\alpha_{50/100}$ obtained by dividing $\alpha_{200/300}$ by $\alpha_{50/100}$ is 1.20 to 1.30, in the heat treatment step of sticking the silicon substrate and the glass substrate to each other, the residual strain generated in the silicon substrate and the glass substrate easily becomes small.

In the glass substrates of Examples 61 to 65 which are concerned with the comparative examples, the range of at least one of $\alpha_{50/100}$, $\alpha_{200/300}$, and $\alpha_{200/300}/\alpha_{50/100}$ falls outside the scope regarding the glass substrate according to an embodiment of the present invention. In addition, in the glass substrates of Examples 61 to 65, $\Delta\alpha_{50/100}$, $\Delta\alpha_{200/300}$, or ($\Delta\alpha_{200/300}-\Delta\alpha_{50/100}$) falls outside the scope regarding the glass substrate according to an embodiment of the present invention. Alternatively, in the glass substrates of Examples 61 to 65, at least one of the composition of the resulting glass substrate and the conditions (1) to (4) falls outside the scope regarding the glass substrate according to an embodiment of the present invention. For that reason, in the heat treatment step of sticking the silicon substrate and the glass substrate to each other, the residual stress generated in the silicon substrate is liable to become large.

Figure 6:
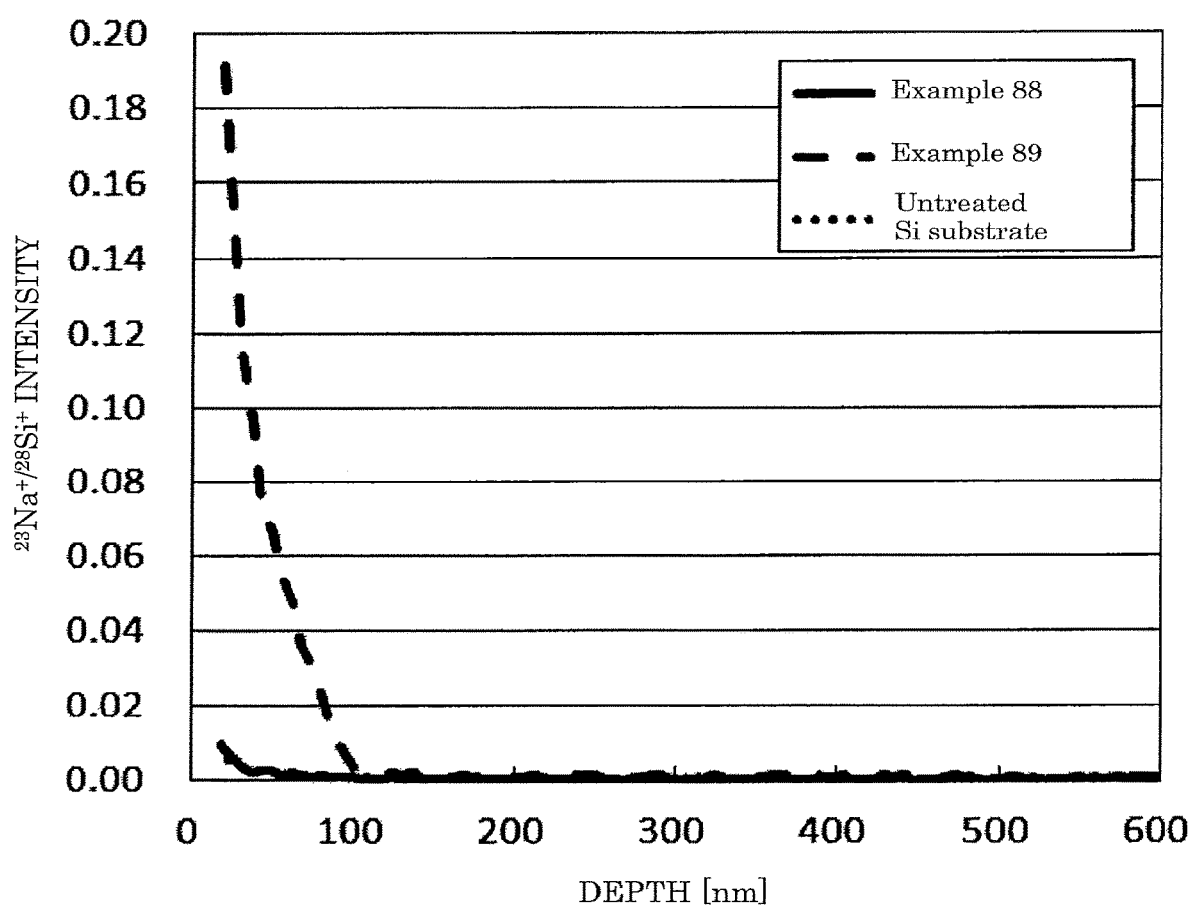
FIG. 6 is a graph showing the SIMS measurement results expressing an influence of the content of an alkali metal oxide.

Next, when each of a glass substrate of Example 88 and a glass substrate of Example 89 was brought into contact with a silicon substrate and then subjected to a heat treatment, a diffusion amount of the alkali metal oxide into the silicon substrate was measured by the secondary ion mass spectrometry (SIMS), and the results are shown in FIG. 6. In the glass substrate of Example 88, the content of the alkali metal oxide ($Na_2O$) is 0.1% or less, whereas in the glass substrate of Example 89, the content of the alkali metal oxide is more than 0.1%. In FIG. 6, the SIMS measurement results of an untreated silicon substrate are also shown for reference.

For the SIMS measurement, ADEPT 1010, manufactured by ULVAC-PHI, INC. was used. A Cs ion was used for a primary ion of the SIMS. As secondary ion species, $^{28}Si^+$ and $^{23}Na^+$ were measured. In the heat treatment of the silicon substrate having been brought into contact with the glass substrate, the temperature was raised from room temperature to 200° C. for 10 minutes, and after keeping at 200° C. for 1 hour, cooling to room temperature was performed for 10 minutes. The compositions of Examples 88 and 89 are shown in Table 8.

TABLE 8

|  |  | Example 88 | Example 89 |
|---|---|---|---|
| Composition (mol %) | $SiO_2$ | 66.8 | 66.1 |
|  | $Al_2O_3$ | 13.0 | 11.3 |
|  | $B_2O_3$ | 4.6 | 7.8 |
|  | MgO | 8.0 | 5.1 |
|  | CaO | 6.6 | 4.5 |
|  | SrO | 1.0 | 5.2 |
|  | BaO | 0.0 | 0.0 |
|  | ZnO | 0.0 | 0.0 |
|  | $Na_2O$ | 0.03 | 0.32 |

Example 88 is one in which 0.03% in outer percentage of $Na_2O$ that is the alkali metal oxide was added to Example 6 and is concerned with a working example. Example 89 is one in which 0.32% in outer percentage of $Na_2O$ that is the alkali metal oxide was added to Example 61 and is concerned with a comparative example. In FIG. 6, the abscissa expresses a depth from the surface on the side coming into contact with the glass substrate within the silicon substrate, and the ordinate expresses a value obtained by dividing the detection number of $^{23}Na^+$ for 1 second by $^{28}Sr$. It is noted from FIG. 6 that from the silicon substrate coming into contact with the glass substrate of Example 89 in which the content of the alkali metal oxide is more than 0.1%, the Na ion diffused to an extent in the vicinity of 100 nm from the surface layer. It is to be noted that the measurement results of the silicon substrate for reference were substantially coincident with the plots of Example 88. Since the alkali ion has an electric charge, it works as a carrier in the silicon substrate and changes the semiconductor characteristics. On the other hand, in the silicon substrate coming into contact with the glass substrate of Example 88 in which the content of the alkali metal oxide is 0.1% or less, the Na ion was not detected similar to the untreated silicon substrate, and therefore, it is indicated that the diffusion of the Na ion from the glass substrate into the silicon substrate was not generated.

Test Example 2

A production example of the light selective transmission type glass 10 shown in FIG. 1A is described. The light selective transmission type glass 10 includes the light selective transmission layer 11 on one surface of the glass substrate 12 which is a circle having a diameter of 15 cm and having a thickness of 0.2 mm.

For the glass substrate 12, the glass of Example 6 shown in Table 1 is used. Here, the content of the alkali metal oxide ($Li_2O$, $Na_2O$, $K_2O$, etc.) is set to 0.1% or less. The glass substrate 12 is one having been subjected to double-sided polishing.

Subsequently, the dye (U) and the dye (A) are mixed in a 15 mass % cyclohexanone solution of a polyimide resin (NEOPULIM (registered trademark) C3450) and thoroughly stirred and dissolved to prepare a coating solution. This coating solution is coated on one main surface of the above-described glass substrate 12 by the spin coating method, and after heating and drying the solvent, the light selective transmission layer 11 having an average thickness $t_0$ of 2.7 μm within the plane of φ15 cm is formed, thereby producing the light selective transmission type glass 10.

Here, for the dye (A), a squarylium-based compound having an absorption maximum wavelength $\lambda$ ($T_{min}$) of 705 nm is used and mixed in an addition amount of 3 (parts by mass based on 100 parts by mass of the transparent resin (B)). In addition, for the dye (U), oxazole-based UVITEX (trademark) OB having an absorption maximum wavelength $\lambda$. ($T_{min}$) of 396 nm is used and mixed in an addition amount of 5 (parts by mass based on 100 parts by mass of the transparent resin (B)).

Figure 4:
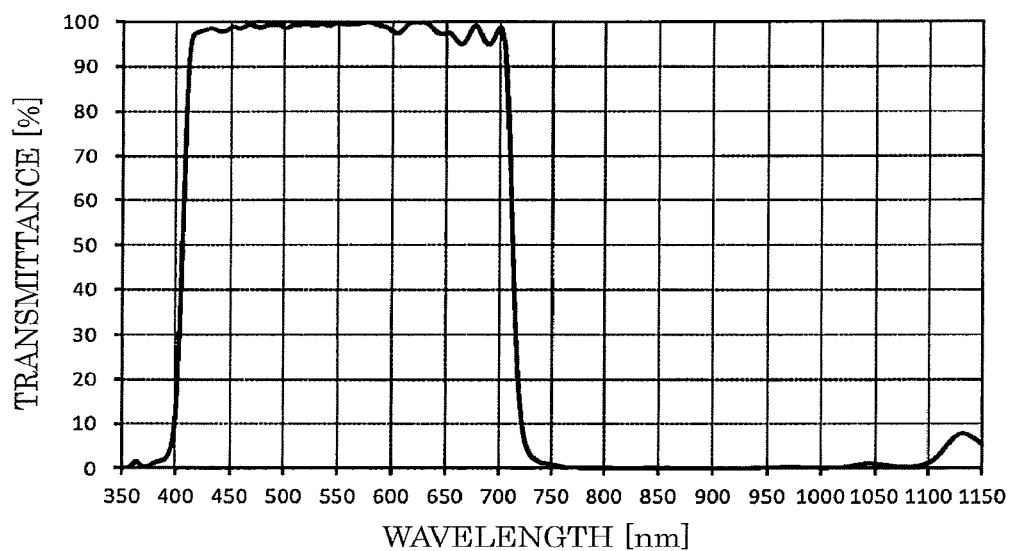
FIG. 4 is a graph of a spectral transmittance (incident angle: 0°) of a reflection layer having a dielectric multilayer film.

FIG. 4 is a spectral transmittance curve (incident angle: 0°) of a reflection layer including a dielectric multilayer film to be used together with the light selective transmission type glass 10. For the reflection layer, one prepared by alternately laminating, on an optical element disposed within a camera module, 40 layers of a $SiO_2$ film having a refractive index of 1.45 and a $TiO_2$ film having a refractive index of 2.41, is used.

As a result of measuring the spectral transmittance, it was noted that a change in the spectral transmittance closed to the visibility at a wavelength of 600 nm to 700 nm such that an average transmittance in a near ultraviolet light having a wavelength of 350 nm to 400 nm is 0.3%, an average transmittance in a visible light having a wavelength of 430 nm to 600 nm is 92%, and an average transmittance in a near infrared light having a wavelength of 700 nm to 1,150 nm is 0.9%, was revealed.

INDUSTRIAL APPLICABILITY

The laminated substrate including a light selective transmission type glass substrate and a silicon substrate laminated thereon according to an embodiment of the present invention is useful for imaging units, such as a digital still camera and a mobile phone camera, each using a solid-state imaging element, etc.

While the present invention has been described in detail and with reference to specific embodiments thereof, it will be apparent to one skilled in the art that various changes and modifications can be made therein without departing from the spirit and scope thereof. It is to be noted that the present application is based on a Japanese patent application filed on Feb. 6, 2015 (Japanese Patent Application No. 2015-022719) and a Japanese patent application filed on Dec. 10, 2015 (Japanese Patent Application No. 2015-241303), the entireties of which are incorporated by reference.

DESCRIPTION OF REFERENCE NUMERALS AND SIGNS

10, 20, 30: Light selective transmission type glass
11, 11a, 11b: Light selective transmission layer
111: Absorption layer 112, 112a, 112b, 112c: Reflection layer
12: Glass substrate
15: Silicone substrate
16: Photodetector array
17: RGB mosaic color filter
18: Resin microlens
19: Solid-state imaging element
21: Adhesive
31: Imaging lens
32: Lens unit
33: Casing
40, 50: Laminated substrate
60: Solid-state imaging unit (camera module)

The invention claimed is:
1. A laminated substrate, comprising:
a solid-state imaging element provided on a silicon substrate; and a light selective transmission type glass, the light selective transmission type glass, comprising:
a glass substrate; and
a light selective transmission layer that is provided on at least one main surface of the glass substrate and selectively transmits at least one selected from the group consisting of near infrared rays, visible light rays, visible light rays of a blue wavelength region, visible light rays of a red wavelength region, and visible light rays of a green wavelength region, among near infrared rays and visible light rays,
wherein:
the glass substrate has a composition satisfying the following conditions, as expressed in terms of a molar percentage based on oxides:
a content of MgO is 3.6% to 15%, and
a content of CaO is 6.8% or less;
the glass substrate has:
an average thermal expansion coefficient $\alpha_{50/100}$ at 50° C. to 100° C. of 2.70 ppm/° C. to 3.20 ppm/° C.;
an average thermal expansion coefficient $\alpha_{200/300}$ at 200° C. to 300° C. of 3.45 ppm/° C. to 3.95 ppm/° C.;
a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30; and
a content of an alkali metal oxide being 0% to 0.1% as expressed in terms of a molar percentage based on oxides; and
the light selective transmission layer is an absorption layer containing a transparent resin and a near ultraviolet ray absorption dye and does not include a near infrared ray absorption dye.
2. The light selective transmission type glass according to claim 1, wherein the average thermal expansion coefficient $\alpha_{200/300}$ at 200° C. to 300° C. of the glass substrate is 3.55 ppm/° C. to 3.85 ppm/° C.
3. The light selective transmission type glass according to claim 1, wherein the glass substrate has a composition comprising, as expressed in terms of a molar percentage based on oxides:
SiO$_2$: 50% to 75%;
Al$_2$O$_3$: 6% to 16%;
B$_2$O$_3$: 0% to 15%;
MgO: 3.6% to 15%;
CaO: 6.8% or less;
SrO: 0% to 11%; and
BaO: 0% to 9.5%.
4. The light selective transmission type glass according to claim 1, wherein:
in the composition of the glass substrate, a total content of CaO, SrO, and BaO is 7% or more as expressed in terms of a molar percentage based on oxides and a relation of {(content of Al$_2$O$_3$)≥(content of MgO)}; and
the glass substrate has a devitrification viscosity of $10^{3.8}$ dPa·sec or more.
5. The light selective transmission type glass according to claim 1, wherein the glass substrate has an average thermal expansion coefficient $\alpha_{100/200}$ at 100° C. to 200° C. of 3.13 ppm/° C. to 3.63 ppm/° C.
6. The light selective transmission type glass according to claim 1, wherein the glass substrate has a content of Fe$_2$O$_3$ being 200 ppm or less as expressed in terms of parts per million mass based on oxides.
7. The light selective transmission type glass according to claim 1, wherein the glass substrate has a Young's modulus of 80 GPa or more.
8. The light selective transmission type glass according to claim 1, wherein the glass substrate has a thickness of 1.0 mm or less.
9. The light selective transmission type glass according to claim 1, wherein the glass substrate has an area of 0.03 m$^2$ or more.
10. The light selective transmission type glass according to claim 1, wherein a density of defect having a size of 0.5 μm or more and 1 mm or less contained in the glass substrate is one or less per cm$^2$.
11. The light selective transmission type glass according to claim 1, wherein the glass substrate has a fictive viscosity of $10^{11.0}$ dPa·sec to $10^{14.1}$ dPa·sec.
12. The light selective transmission type glass according to claim 1, wherein the glass substrate satisfies the following:

{0.0177×(content of SiO$_2$)−0.0173×(content of Al$_2$O$_3$)+0.0377×(content of B$_2$O$_3$)+0.0771×(content of MgO)+0.1543×(content of CaO)+ 0.1808×(content of SrO)+0.2082×(content of BaO)+0.0344×(12.3+log$_{10}$ 60−log$_{10}$ η)} is 2.70 to 3.20;

{0.0181×(content of SiO$_2$)+0.0004×(content of Al$_2$O$_3$)+0.0387×(content of B$_2$O$_3$)+0.0913×(content of MgO)+0.1621×(content of CaO)+ 0.1900×(content of SrO)+0.2180×(content of BaO)+0.0391×(12.3+log$_{10}$ 60−log$_{10}$ η)} is 3.13 to 3.63;

{0.0177×(content of SiO$_2$)+0.0195×(content of Al$_2$O$_3$)+0.0323×(content of B$_2$O$_3$)+0.1015×(content of MgO)+0.1686×(content of CaO)+ 0.1990×(content of SrO)+0.2179×(content of BaO)+0.0312×(12.3+log$_{10}$ 60−log$_{10}$ η)} is 3.45 to 3.95; and {0.0111×(content of SiO$_2$)+0.0250×(content of Al$_2$O$_3$)+0.0078×(content of B$_2$O$_3$)+0.0144×(content of MgO)+0.0053×(content of CaO)+ 0.0052×(content of SrO)+0.0013×(content of BaO)−0.0041×(12.3+log$_{10}$ 60−log$_{10}$ η)} is 1.20 to 1.30, in which:
the content of SiO$_2$, the content of Al$_2$O$_3$, the content of B$_2$O$_3$, the content of MgO, the content of CaO, the content of SrO, and the content of BaO are respectively a content of each of the components contained in the resulting glass as expressed in terms of a molar percentage based on oxides; and
η is a fictive viscosity (unit: dPa·sec).
13. The light selective transmission type glass according to claim 1, wherein the glass substrate has a weight loss value relative to a 5 mass % hydrofluoric aqueous solution at 25° C. of 0.05 $(mg/cm^2)$/min or more and 0.20 $(mg/cm^2)$/min or less.

14. The light selective transmission type glass according to claim 1, wherein the glass substrate has a photoelastic constant of 31 nm/(MPa·cm) or less.

15. The light selective transmission type glass according to claim 1, wherein a reflection layer having a dielectric multilayer film is provided on at least one main surface of the glass substrate.

* * * * *